(12) United States Patent
Shiina et al.

(10) Patent No.: US 8,382,636 B2
(45) Date of Patent: Feb. 26, 2013

(54) CONTINUOUSLY VARIABLE TRANSMISSION

(75) Inventors: Takahiro Shiina, Susono (JP); Akira Murakami, Gotenba (JP); Hiroyuki Ogawa, Susono (JP); Daisuke Tomomatsu, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/000,426

(22) PCT Filed: Dec. 2, 2009

(86) PCT No.: PCT/JP2009/006567
§ 371 (c)(1),
(2), (4) Date: Dec. 21, 2010

(87) PCT Pub. No.: WO2011/067814
PCT Pub. Date: Jun. 9, 2011

(65) Prior Publication Data
US 2012/0231925 A1 Sep. 13, 2012

(51) Int. Cl.
*F16H 13/10* (2006.01)
(52) U.S. Cl. .............................. 476/36; 476/1
(58) Field of Classification Search ............... 476/1, 36, 476/37, 38
See application file for complete search history.

(56) References Cited

U.S. PATENT DOCUMENTS

| | | | |
|---|---|---|---|
| 3,049,019 A * | 8/1962 | Lapointe et al. .............. | 475/188 |
| 5,372,555 A | 12/1994 | Hibi | |
| 5,577,423 A * | 11/1996 | Mimura ........................ | 74/650 |
| 6,241,636 B1 * | 6/2001 | Miller ............................. | 476/38 |
| 6,312,358 B1 * | 11/2001 | Goi et al. ....................... | 477/37 |
| 7,950,275 B2 * | 5/2011 | Isono ............................ | 73/132 |
| 8,287,424 B2 * | 10/2012 | Gu et al. ........................ | 476/38 |
| 2007/0167279 A1 * | 7/2007 | Miller ............................ | 476/36 |
| 2007/0287577 A1 * | 12/2007 | Miller ............................ | 476/36 |
| 2008/0248917 A1 * | 10/2008 | Nichols et al. ................. | 476/36 |
| 2008/0305919 A1 * | 12/2008 | Rennerfelt .................... | 476/36 |

FOREIGN PATENT DOCUMENTS

| | | |
|---|---|---|
| JP | U-62-179458 | 11/1987 |
| JP | 06-017915 | 1/1994 |
| JP | A-2002-213551 | 7/2002 |
| JP | A-2002-372113 | 12/2002 |

OTHER PUBLICATIONS

International Search Report issued in Application No. PCT/JP2009/006567; Dated Jan. 12, 2010 (With Translation).

* cited by examiner

Primary Examiner — David M Fenstermacher
(74) Attorney, Agent, or Firm — Oliff & Berridge, PLC

(57) ABSTRACT

A continuously variable transmission having a continuously variable transmission mechanism for transmitting torque between an input side and an output side by means of frictional forces generated by pushing the input disc and the output disc against the planetary balls and continuously varying a transmission gear ratio between the input side and the output side includes a second group of helical gears capable of generating a first axial force for pushing the input disc toward the output disc, a first group of helical gears capable of generating a second axial force for pushing the output disc toward the input disc, and a thrust bearing and a central shaft for transmitting, when an opposite force in such a direction as to move the input disc away from the output disc and opposite force to the first force is generated on a side of the input disc, the opposite force to the output disc.

6 Claims, 5 Drawing Sheets

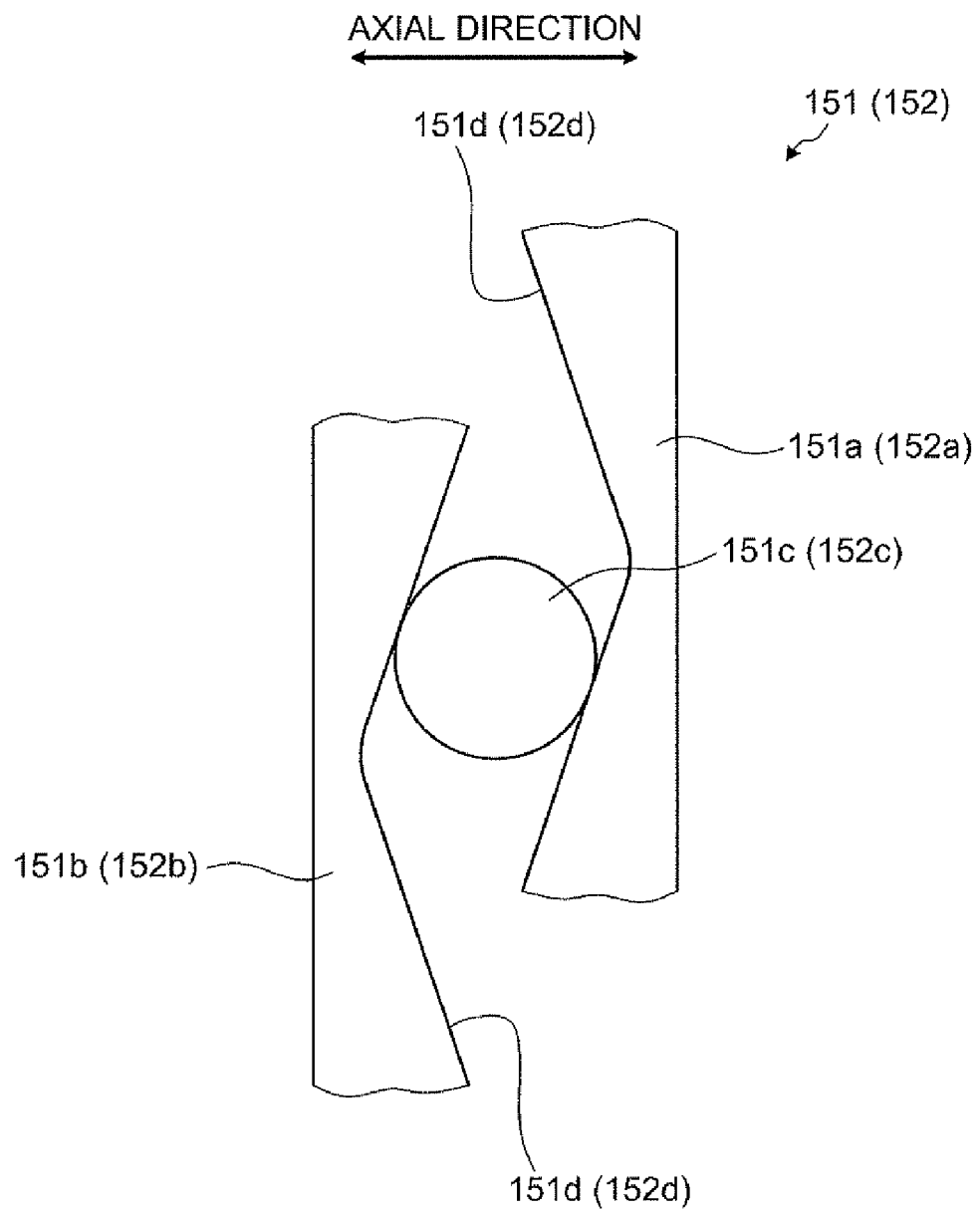

CONTINUOUSLY VARIABLE TRANSMISSION

FIELD

The present invention relates to a continuously variable transmission having a continuously variable transmission mechanism which includes an input member, an output member, and rotary members sandwiched therebetween, transmits torque between the input member and the output member by frictional forces generated by pressing the input member and the output member against the rotary members, and continuously varies a transmission gear ratio between the input member and the output member.

BACKGROUND

As this type of continuously variable transmission, what is called a toroidal continuously variable transmission having an input disc as the input member, an output disc as the output member, and friction rollers as the rotary members to vary a transmission gear ratio by changing a tilting angle of the friction rollers is known conventionally. For example, disclosed in the following Patent Literature 1 is a transmission having a pair of helical gears capable of generating, in an output disc, an axial pressing force toward an input disc. In this toroidal continuously variable transmission in the Patent Literature 1, when output torque of the engine is input to the input disc through an input shaft, the pair of helical gears generates the axial thrust (thrust force) from the output disc toward the input disc and presses the output disc with the thrust to thereby press the output disc against the input disc.

CITATION LIST

Patent Literature

Patent Literature 1: Japanese Patent Application Laid-open No. 6-17915

SUMMARY

Technical Problem

However, the pair of helical gears generates the axial thrust according to rotating directions of the respective driving and driven helical gears and therefore, when the rotating directions of the respective helical gears are reversed, a direction of the thrust becomes opposite. Therefore, in the toroidal continuously variable transmission in the Patent Literature 1, for example, when torque in a reverse direction is input to an output shaft as in deceleration, the rotating directions of the pair of helical gears connected to the output shaft are reversed as well and therefore a direction of the thrust generated by the pair of helical gears becomes opposite. As a result, in the continuously variable transmission, the pressing force directed toward the input disc does not act on the output disc, the force for sandwiching the friction rollers reduces, and therefore it may be impossible to secure a transmission torque capacity between the input disc and the output disc.

Therefore, it is an object of the present invention to provide a continuously variable transmission capable of mending the problem of the conventional technology and appropriately generating pressing forces in opposite directions along an axis between an input member and an output member.

Solution to Problem

According to one aspect of the present invention, a continuously variable transmission including a continuously variable transmission mechanism including an input member, an output member, and a rotary member sandwiched therebetween, transmitting torque between the input member and the output member by means of frictional forces generated by pushing the input member and the output member against the rotary member, and continuously varying a transmission gear ratio between the input member and the output member, wherein the continuously variable transmission includes a first axial force generating portion capable of generating a first axial force for pushing the input member toward the output member, a second axial force generating portion capable of generating a second axial force for pushing the output member toward the input member, and an opposite axial force transmitting portion for transmitting, when an opposite axial force in such a direction as to move the input member away from the output member and opposite force to the first force is generated on a side of the input member, the opposite force to the output member to push the output member toward the input member.

Here, the first axial force generating portion may generate the opposite force as well as the first force. Still further, the first axial force generating portion may rotate in one direction to generate the first force and rotate in the other direction to generate the opposite force.

Further, the second axial force generating portion may generate the opposite force as well as the second force. Still further, the second axial force generating portion may rotate in one direction to generate the second force and rotate in the other direction to generate the opposite force.

According to another aspect of the present invention, a continuously variable transmission including a continuously variable transmission mechanism including an input member, an output member, and a rotary member sandwiched therebetween, transmitting torque between the input member and the output member by means of frictional forces generated by pushing the input member and the output member against the rotary member, and continuously varying a transmission gear ratio between the input member and the output member, wherein the continuously variable transmission includes a first axial force generating portion for rotating in one direction to generate a first axial force for pushing the input member toward the output member and for rotating in the other direction to generate an axial opposite force opposite to the first force, a second axial force generating portion capable of generating a second axial force for pushing the output member toward the input member, and an opposite axial force transmitting portion for transmitting the opposite force to the output member to push the output member toward the input member when the first axial force generating portion generates the opposite force.

Advantageous Effects of Invention

When the opposite force in such a direction as to move the input member away from the output member is generated, the continuously variable transmission according to the present invention can transmit the opposite force to the output member to push the output member toward the input member. Therefore, in this case, the continuously variable transmission can sandwich the rotary members between the input member and the output member with desired contact pressure, obtain the suitable transmission torque capacity, and transmit the torque between the input side and the output side. When the first axial force generating portion generates the opposite force, the continuously variable transmission can transmit the opposite force to the output member to push the output member toward the input member. Therefore, irrespective of the direction of the force generated by the first axial force generating portion, the continuously variable transmission can sandwich the rotary members between the input member and the output member with desired contact pressure, obtain the suitable transmission torque capacity, and transmit the torque between the input side and the output side.

BRIEF DESCRIPTION OF DRAWINGS

FIG. 7 is a partial schematic diagram for explaining another example of the input-side cam mechanism and the output-side cam mechanism.

DESCRIPTION OF EMBODIMENTS

Embodiments of a continuously variable transmission according to the present invention will be described in detail based on the drawings. The invention is not limited by the embodiments.

Embodiment

An embodiment of the continuously variable transmission according to the invention will be described based on FIGS. 1 to 7.

The continuously variable transmission in the embodiment is formed as what is called a traction planetary gear mechanism made up of a plurality of rotary elements and includes an input member, an output member, and rotary members sandwiched therebetween. Torque is transmitted between the input member and the output member by frictional forces generated by pressing the input member and the output member against the rotary members and a transmission gear ratio between the input member and the output member is varied continuously. In this type of continuously variable transmission, the input member and the output member are pressed against the rotary members to thereby generate the frictional forces therebetween and the torque can be transmitted between the input member and the output member by the frictional forces. To explain the continuously variable transmission in line with various structures described later, the continuously variable transmission includes an input disc as the input member connected to an input shaft, an output disc as the output member connected to an output shaft, and planetary balls as the rotary members. In this continuously variable transmission, the input disc and the output disc are pressed against the planetary balls to generate the frictional forces therebetween to thereby transmit the torque between the input disc and the output disc. In this continuously variable transmission, by varying a ratio between a contact radius between the input disc and the planetary balls and a contact radius between the output disc and the planetary ball while maintaining a torque transmittable state, a ratio between a rotating speed (the number of rotations) of the input disc and a rotating speed (the number of rotations) of the output disc, i.e., a transmission gear ratio which is a ratio between the rotating speeds of the input shaft and the output shaft is varied continuously. The continuously variable transmission will be described below in detail by using FIG. 1.

Figure 1:
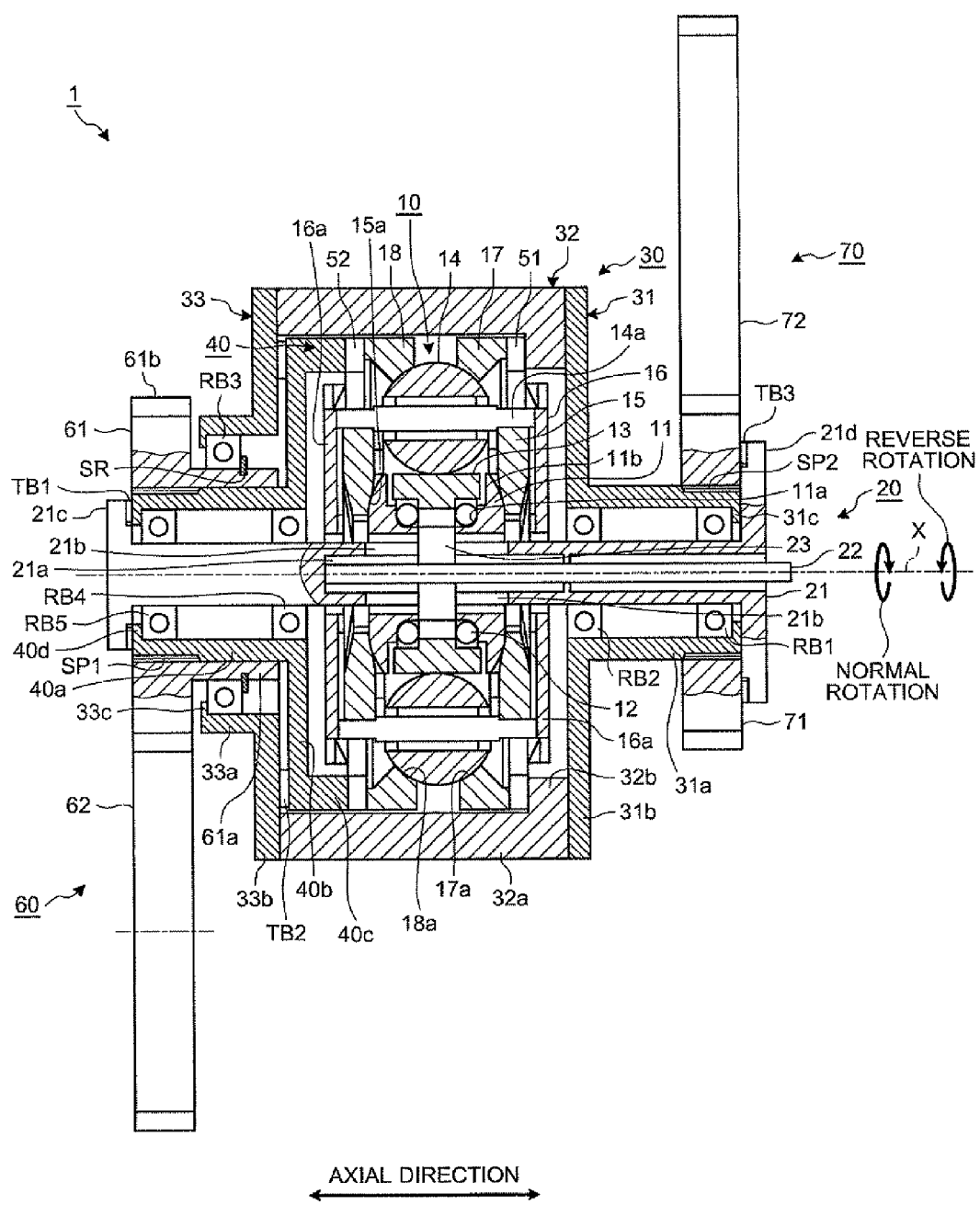
FIG. 1 is a sectional view along an axial direction and showing an example of a structure of a continuously variable transmission according to the present invention.

Reference numeral 1 in FIG. 1 designates the continuously variable transmission in the embodiment. The continuously variable transmission 1 includes a continuously variable transmission mechanism 10 for continuously varying the transmission gear ratio, a shift mechanism 20 for actuating the continuously variable transmission mechanism 10, and two rotary torque transmission shafts respectively having functions as input and output shafts of the torque. In the embodiment, one of the rotary torque transmission shafts will be described as an input shaft 30 and the other will be described as an output shaft 40 for the sake of convenience. However, the input side and the output side can be exchanged, i.e., the input shaft 30 can be configured as the output shaft and the output shaft 40 can be configured as the input shaft. Moreover, the input shaft 30 can also function as the output shaft and the output shaft 40 can also function as the input shaft.

In the continuously variable transmission 1, the input shaft 30 and the output shaft 40 are arranged coaxially. The input shaft 30 and the output shaft 40 share a rotation axis X as shown in FIG. 1. In the following description, a direction along the rotation axis X is referred to as an axial direction and a direction around the rotation axis X will be referred to as a circumferential direction unless otherwise specified. A direction orthogonal to the rotary axis X will be referred to as a radial direction and the radial direction includes a radially inward direction toward an inside and a radially outward direction toward an outside.

Firstly, the shift mechanism 20 will be described.

The shift mechanism 20 in the embodiment includes a central shaft 21, a shift shaft 22, and a shift key 23. The shift mechanism 20 moves an idler plate 11 of the continuously variable transmission mechanism 10 (described later) in the axial direction by relatively moving the shift shaft 22 and the shift key 23 with respect to the central shaft 21 to thereby continuously vary the transmission gear ratio.

The central shaft 21 is an idler shaft having the rotation axis X as a central axis and is fixed to a fixed portion of the continuously variable transmission such as a vehicle body and a case (not shown), for example. In other words, the central shaft 21 is a fixed shaft which does not rotate with respect to the fixed portion. To put it concretely, the central shaft 21 is formed into a columnar shape about the rotation axis X as a central axis and includes a hollow portion 21a which is open at its one end in the axial direction and two slits 21b connecting the hollow portion 21a and a radially outer portion.

The hollow portion 21a is in a columnar shape about the rotation axis X as a central axis. The hollow portion 21a supports the inserted shift shaft 22 so that the shift shaft 22 can rotate with respect to the central shaft 21. For example, bearings (not shown) or the like may be used for the support. Each of the slits 21b is a through hole formed through the central shaft 21 from an outer peripheral face to the hollow portion 21a and is long in the axial direction. The two slits 21b are formed in symmetric positions with respect to the rotation axis X.

Furthermore, the central shaft 21 has a concentric first disc portion 21c at an end portion without an opening of the hollow portion 21a. The first disc portion 21c has a larger outer diameter than an outer peripheral face of a main portion of the central shaft 21. The first disc portion 21c has such an outer diameter as to face an end portion (a second annular portion 40d described later) of the output shaft 40 in the axial direction and forms a first wall face portion of the central shaft 21. The central shaft 21 has a concentric second disc portion 21d at the other end portion on an opposite side from the first disc portion 21c. The second disc portion 21d has a larger outer diameter than the outer peripheral face of the main portion of the central shaft 21. The second disc portion 21d has such an outer diameter as to face an annular wall face of a first helical gear 71 in a second group 70 of helical gears (described later) in the axial direction and forms a second wall face portion of the central shaft 21. In this manner, the opposite end portions of the central shaft 21 have flange-like shapes because of the first disc portion 21c and the second disc portion 21d.

The shift shaft 22 is formed into a columnar shape, for example, having such a length that its one end comes in contact with a wall of the hollow portion 21a in the axial direction and the other end protrudes from an opening of the hollow portion 21a when the shift shaft 22 is inserted into the hollow portion 21a to have the rotation axis X as its central axis. The shift shaft 22 has an external thread portion 22a shown in FIG. 2 helically formed in the circumferential direction in an outer peripheral face connecting respective portions which face the two slits 21b when the shift shaft 22 is inserted into the hollow portion 21a.

Figure 2:
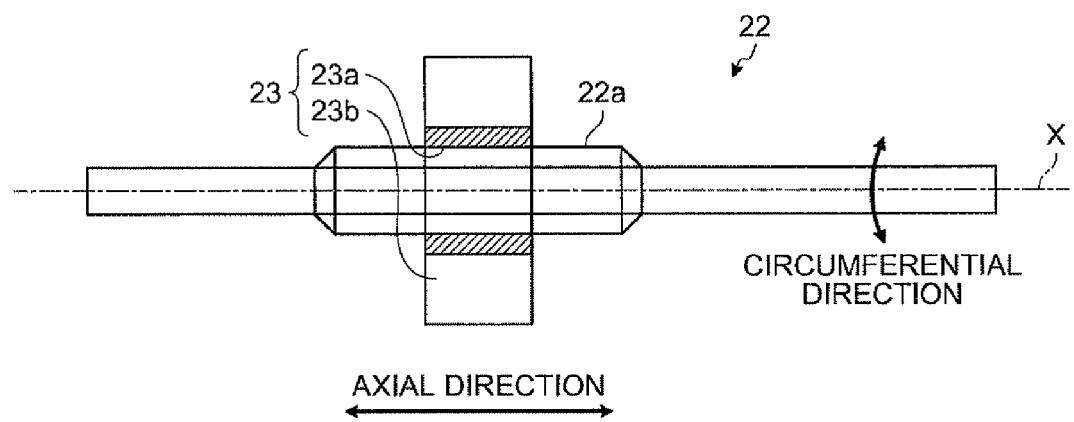
FIG. 2 is a drawing showing a shift shaft and a shift key included in the continuously variable transmission according to the present invention.

The shift key 23 has an internal thread portion 23a to be helically engaged with the external thread portion 22a of the shift shaft 22 as shown in FIG. 2. The internal thread portion 23a is helically formed in an inner peripheral face of a cylindrical portion. The shift key 23 also has key portions 23b which can move in a longitudinal direction along the slits 21b as shown in FIG. 2. The key portion 23b is in a shape of a plate protruding radially outward from an outer peripheral face of the cylindrical portion provided with the internal thread portion 23a and is provided to each of the slits 21b. To put it concretely, the key portions 23b are formed in such shapes as to pass through the slits 21b and protrude radially outward from the outer peripheral face of the central shaft 21. The key portions 23b are formed so that their axial widths are shorter than longitudinal lengths of the slits 21b as shown in FIG. 1. As a result, when the shift shaft 22 is rotated in the circumferential direction, the key portions 23b of the shift key 23 are locked to wall faces in the circumferential direction of the slits 21b and therefore the shift key 23 moves in the axial direction according to a direction of the rotation by action of screwing of the external thread portion 22a and the internal thread portion 23a with each other. In other words, the respective key portions 23b of the shift key 23 can axially reciprocate in the respective slits 21b by the rotation of the shift shaft 22. Here, the shift shaft 22 is rotated in the desired circumferential direction by a shift device (not shown). For example, the shift device includes an actuator such as an electric motor as a drive source and has also a link mechanism if necessary.

Firstly, the continuously variable transmission mechanism 10 in the embodiment will be described in detail.

The continuously variable transmission mechanism 10 includes the idler plate 11, bearing balls 12, an idler roller 13, planetary balls 14, tilting arms 15, a carrier 16, an input disc 17, and an output disc 18.

The idler plate 11 is a bearing member for supporting the idler roller 13 for rotation. The idler plate 11 is formed into a cylindrical shape having the rotation axis X as its central axis and the central shaft 21 is inserted into the idler plate 11. To put it concretely, the idler plate 11 has an inner peripheral face with a larger diameter than the outer peripheral face of the central shaft 21 so as to be able to reciprocate in the axial direction with respect to the central shaft 21. The idler plate 11 has substantially the same axial length as the longitudinal lengths of the slits 21b, for example. A section of the idler plate 11 along the axial direction is tapered in the radially outward direction.

The idler plate 11 is mounted to the outer peripheral portion of the central shaft 21 with the respective key portions 23b of the shift key 23 interposed therebetween. Protruding ends of the respective key portions 23b are fitted with the inner peripheral portion of the idler plate 11. Therefore, as the shift key 23 moves in the axial direction, the idler plate 11 reciprocates in the axial direction with respect to the central shaft 21.

Furthermore, the idler plate 11 has a circumferential annular groove 11a formed radially inward from the outer peripheral face. The annular groove 11a is formed at an axial middle portion of the idler plate 11. In the annular groove 11a, annular boundaries between a bottom face and side wall faces are formed as smooth arc-shaped recessed curved faces. Here, the spherical bearing balls 12 are disposed on the annular boundary portions. In other words, the recessed curved faces of the boundary portions serve as bearing faces on which the bearing balls 12 are disposed.

The bearing balls 12 support the idler roller 13 for circumferential rotation.

The idler roller 13 serves as a rotation axis of the planetary balls 14. The idler roller 13 has a main body portion formed into a cylindrical shape having the rotation axis X as its central axis and is disposed in the annular groove 11a of the idler plate 11 so as to be rotatable with respect to the idler plate 11. To put it concretely, the idler roller 13 has substantially the same axial length as a groove width of the annular groove 11a while being able to smoothly rotate in the circumferential direction with respect to the idler plate 11. The idler roller 13 has a cylindrical portion having a smaller axial length than the main body portion and a smaller diameter of an inner wall face than the main body portion at an axial middle portion of an inner peripheral face of the main body portion and axial opposite end portions of the inner wall of the cylindrical portion are brought into contact with the bearing balls 12. In other words, the idler roller 13 is supported on the idler plate 11 through the bearing balls 12 disposed at the boundary portions of the annular groove 11a so as to be rotatable in the circumferential direction with respect to the idler plate 11. Therefore, the idler roller 13 can serve as the rotation axis of the planetary balls 14 in contact with an outer peripheral face of the main body portion of the idler roller 13 and can reciprocate together with the idler plate 11 in the axial direction with respect to the central shaft 21 as the idler plate 11 moves in the axial direction.

The planetary balls 14 are rolling elements and correspond to ball-type pinions in a traction planetary gear mechanism. Although the planetary balls 14 are preferably perfect spherical bodies as shown in FIGS. 1 and 3, they may have oval sectional shapes as with a Rugby ball, for example, if their outer peripheral faces are smooth curved faces.

The planetary balls 14 are rotatably supported on support shafts 14a passing through centers of the planetary balls 14. For example, the planetary ball 14 is allowed to rotate (i.e., rotate on its axis) with respect to the support shaft 14a by bearings 14b disposed between an outer peripheral face of the support shaft 14a and the planetary ball 14.

The support shafts 14a are disposed so that their central axes are in the same plane as the rotation axis X. Standard positions of the support shafts 14a are positions where the central axes are parallel to the rotation axis X as shown in FIG. 1. Here, opposite end portions of the support shaft 14a protrude from an outer peripheral face (outer circumferential curved face) of the planetary ball 14 and mounted to the tilting arms 15 described later. Therefore, the support shaft 14a swings (tilts) from the standard position in FIG. 1 to a tilted position or from the tilted position to the standard position as the tilting arms 15 move. The tilting is carried out in the same plane as the central axis of the support shaft 14a and the rotation shaft X.

Figure 3:
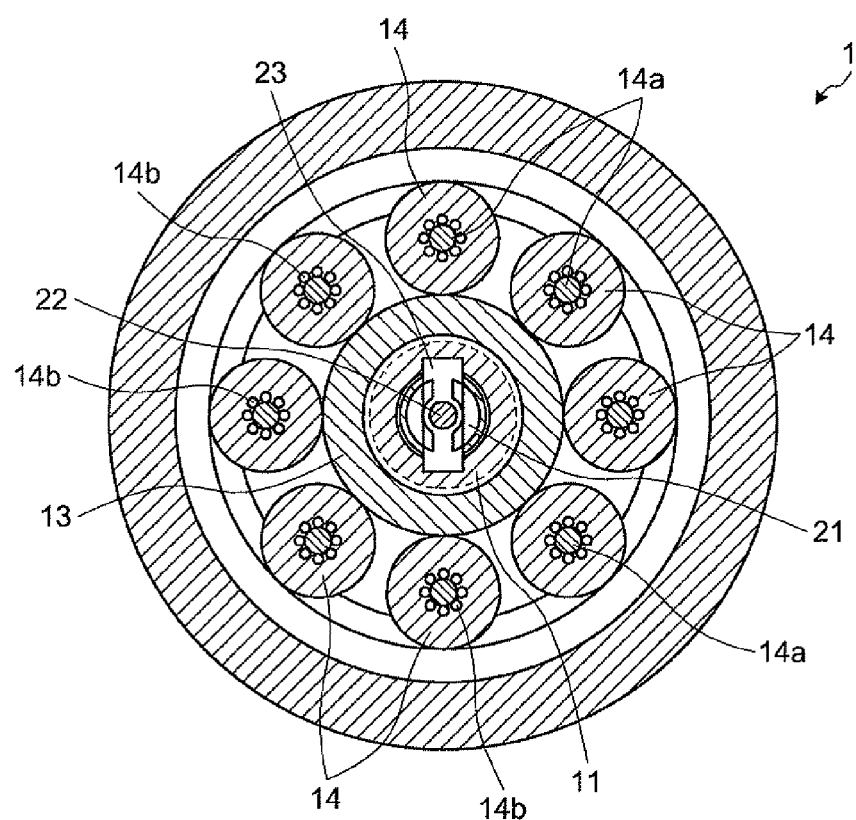
FIG. 3 is a sectional view along a direction perpendicular to the axial direction and showing a structure of a main portion related to speed change of the continuously variable transmission according to the present invention.

Here, the plurality of (e.g., eight as shown in FIG. 3) planetary balls 14 are provided on an outer peripheral side of the idler roller 13. Therefore, the support shafts 14a and the bearings 14b are provided to correspond to the number of planetary balls 14. The respective planetary balls 14 are disposed at predetermined intervals and substantially out of touch with each other so that drag torque does not act between the respective planetary balls 14 when the planetary balls 14 roll on the outer peripheral face of the idler roller 13.

The tilting arms 15 are members for applying tilting forces to the support shafts 14a and the planetary balls 14 as the idler plate 11 moves in the axial direction to tilt the rotation central axes of the planetary balls 14, i.e., the central axes of the support shafts 14a. The tilting arms 15 are formed into shapes extending in a direction perpendicular to the rotation axis X. To put it concretely, the tilting arms 15 are formed to have tapered radially inward tip end portions. The tilting arms 15 are respectively disposed at opposite end portions of the support shafts 14a and the end portions of the respective support shafts 14a are mounted to radially outer end portions of the tilting arms 15. The tilting arms 15 are disposed so as not to move in the axial direction and not to rotate in the circumferential direction with respect to the central shaft 21.

The pair of tilting arms 15 mounted to the opposite end portions of the support shaft 14a is provided to each set of the support shaft 14a and the planetary ball 14. The pair of tilting arms 15 sandwiches wall faces of axial opposite end portions of the idler plate 11 between tapered wall faces of radially inner tip end portions of the respective tilting arms 15. The pair of tilting arms 15 has the respective tapered wall faces as contact faces 15a with the idler plate 11. The pair of tilting arms 15 is formed to have such tip end portions that the contact faces 15a facing each other in the axial direction extend away from each other toward the radially inside.

On the other hand, the idler plate 11 has respective wall faces of the axial opposite end portions as contact faces 11b with the contact faces 15a of the respective tilting arms 15. The idler plate 11 has the sectional shape along the axial direction and tapered radially outward as described above. Therefore, sectional shapes of the contact faces 11b at the opposite end portions of the idler plate 11 along the axial direction are also tapered radially outward. Here, the respective contact faces 11b are curved faces protruding axially outward.

By forming the contact faces 11b of the idler plate 11 and the contact faces 15a of the tilting arms 15 as described above, the contact faces 11b of the idler plate 11 and the contact faces 15a of the respective tilting arms 15 come in point contact or line contact with each other. Therefore, at respective contact portions between them, a load of the idler plate 11 moving along the axial direction acts as diagonally outward forces with respect to the central shaft 21 on the respective tilting arms 15. The tilting arms 15 tilt the support shaft 14a in the above-described plane with the forces. As a result, each support shaft 14a and the planetary ball 14 tilt in the above-described plane by the forces acting on the tilting arms 15 when the idler plate 11 is moved in the axial direction.

The carrier 16 retains the planetary balls 14, the support shafts 14a, and the tilting arms 15 so that they do not move in the axial direction with respect to the central shaft 21. The carrier 16 has a pair of disc portions 16a having the rotation axis X as its central axis. The respective disc portions 16a are disposed in such positions as to sandwich the planetary balls 14, the support shafts 14a, the tilting arms 15, and the like in the axial direction in such a manner that the disk portions 16a do not move in the axial direction and do not rotate in the circumferential direction with respect to the central shaft 21.

In this carrier 16, the respective disc portions 16a are connected by a plurality of connecting shafts (not shown) and formed into a shape of a cage as a whole. As a result, the carrier 16 has open portions on its outer peripheral face. A portion of each planetary ball 14 protrudes radially outward from the outer peripheral face of the carrier 16 through the open portion.

In this carrier 16, the same number of radial grooves as the above-described pairs of tilting arms 15 are formed on each of opposed faces of the respective disc portions 16a. The respective radial grooves form a radial shape radiating from the rotation axis X and are formed at predetermined intervals along the circumferential direction. Each radial groove is formed in a position, a shape, and a size corresponding to each tilting arm 15. For example, each radial groove is formed from a central portion to an outer peripheral edge. Here, the respective tilting arms 15 are disposed in the respective radial grooves so as to carry out the above-described tilting operation and not to move in the axial direction and not to rotate in the circumferential direction with respect to the central shaft 21.

The input disc 17 and the output disc 18 come in contact with the outer peripheral faces of the respective planetary balls 14 exposed radially outward from the open portions of the carrier 16 to transmit mechanical power, i.e., the torque between the respective planetary balls 14 and themselves. The input disc 17 is an input-side rotating body to which torque is input from the input shaft 30 described later and forms the input member of the continuously variable transmission mechanism 10. On the other hand, the output disc 18 is an output-side rotating body for outputting the torque transmitted from the input disc 17 through the respective planetary balls 14 to the output shaft 40 described later and forms the output member of the continuously variable transmission mechanism 10.

The input disc 17 and the output disc 18 are respectively formed into annular shapes having the rotation axis X as their central axes. The input disc 17 and the output disc 18 are disposed to face each other in the axial direction and to sandwich the respective planetary balls 14. The input disc 17 and the output disc 18 have contact faces 17a and 18a in contact with the outer peripheral faces of the respective planetary balls 14. The contact face 17a is provided to a radially outer end portion of the input disc 17. On the other hand, the contact face 18a is provided to a radially outer end portion of the output disc 18. The respective contact faces 17a and 18a have recessed arc faces having a curvature equal to a curvature of the curved outer peripheral faces of the planetary balls 14.

The input disc 17 is formed to have an outer diameter slightly smaller than an inner diameter of a cylindrical portion 32a of an input hub 32 of the input shaft 30 described later. The input disc 17 is disposed between the respective planetary balls 14 and an annular portion 32b of the input hub 32. As a result, the radially outer end portion of the input disc 17 faces an annular face of the annular portion 32b of the input hub 32 in the axial direction.

On the other hand, the output disc 18 is formed to have an outer diameter slightly smaller than the inner diameter of the cylindrical portion 32a of the input hub 32. The output disc 18 is disposed between the respective planetary balls 14 and a second cylindrical portion 40c of the output shaft 40 described later in the axial direction. As a result, the radially outer end portion of the output disc 18 faces an annular end face of the second cylindrical portion 40c in the axial direction.

The continuously variable transmission 1 in the embodiment is provided with an input-side cam mechanism 51 and an output-side cam mechanism 52.

The input-side cam mechanism 51 is for converting torque acting between the input hub 32 and the input disc 17 into a thrust in the axial direction and a torque cam mechanism is used as the input-side cam mechanism 51, for example. The input-side cam mechanism 51 is disposed between the annular face of the annular portion 32b of the input hub 32 and the radially outer end portion of the input disc 17. The input-side cam mechanism 51 forms, together with the input shaft 30, a torque input portion for transmitting torque from outside to the input disc 17.

The output-side cam mechanism 52 is for converting torque acting between the output disc 18 and the output shaft 40 into a thrust in the axial direction and a torque cam mechanism can be used similarly as the output-side cam mechanism 52. The output-side cam mechanism 52 is disposed between the radially outer end portion of the output disc 18 and the annular end face of the second cylindrical portion 40c of the output shaft 40. The output-side cam mechanism 52 forms, together with the output shaft 40, a torque output portion for transmitting torque of the output disc 18 after shift transmission to the outside.

Figure 4:
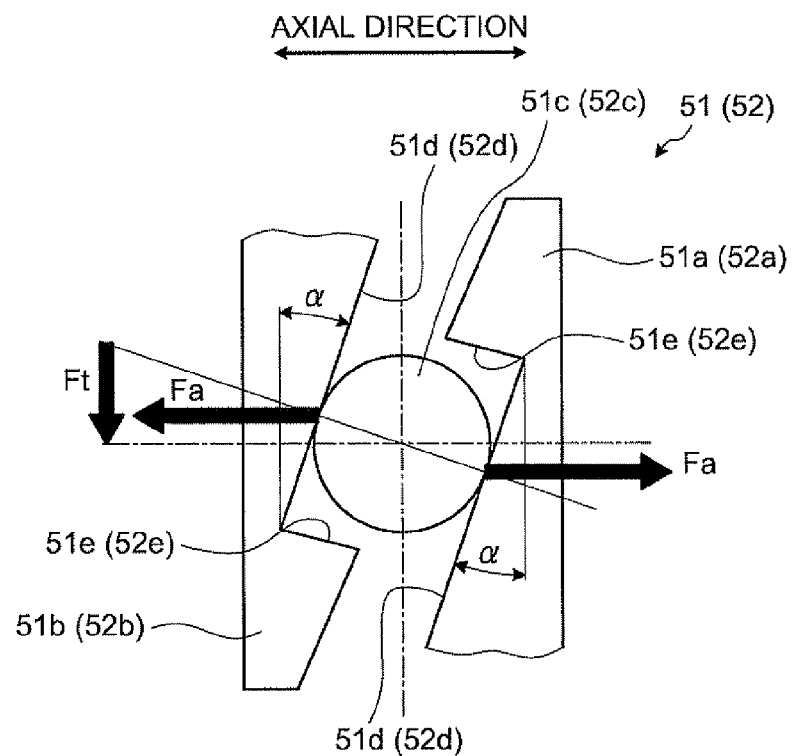
FIG. 4 is a partial schematic diagram for explaining an example of an input-side cam mechanism and an output-side cam mechanism included in the continuously variable transmission according to the present invention.

FIG. 4 shows an example of a structure related to a principle of the input-side cam mechanism 51 and the output-side cam mechanism 52. The input-side cam mechanism 51 shown here as an example generates the axial thrust when the input shaft 30 is rotated by torque in a normal direction to rotate the input disc 17 in the same direction or when the input disc 17 is rotated by torque in a reverse direction to rotate the input shaft 30 in the same direction. Here, for the sake of convenience, rotation of the input shaft 30 and the like in one circumferential direction is referred to as "normal rotation" while rotation in a reverse direction to this normal rotation is referred to as "reverse rotation".

The input-side cam mechanism 51 includes an annular first rotary member 51a and an annular second rotary member 51b having the rotation axis X as their rotation axes and disposed to face each other on the rotation axis X and cam rollers 51c sandwiched between respective opposed faces of the first rotary member 51a and the second rotary member 51b. Here, the cam roller 51c is sandwiched between cam faces 51d respectively formed on the opposed faces of the first rotary member 51a and the second rotary member 51b. One of the respective cam faces 51d is inclined so that an axial interval between a standard face and itself gradually widens in the circumferential direction in the normal rotation and the other is inclined so that an axial interval between the standard face and itself gradually narrows in the circumferential direction in the normal rotation. The standard face is an imaginary plane including the normal to the rotation axis X. There are the plurality of cam rollers 51c and the cam faces 51d are formed to correspond to the number of cam rollers 51c.

Here, the first rotary member 51a is disposed to rotate integrally with the annular face of the annular portion 32b of the input hub 32 and the second rotary member 51b is disposed to rotate integrally with the radially outer end portion of the input disc 17. Therefore, in the input-side cam mechanism 51, if the torque in the normal direction is input to the input shaft 30 or the torque in the reverse direction is input to the input disc 17, an interval between the respective cam faces 51d narrows and the respective cam faces 51d push the cam roller 51c against each other to be integrated with each other. In this way, in the input-side cam mechanism 51, when the torque in the normal direction is input to the input shaft 30, the torque is transmitted from the input hub 32 to the input disc 17. When the torque in the reverse direction is input to the input disc 17, the torque is transmitted from the input disc 17 to the input hub 32 (input shaft 30).

Furthermore, when the torque in the normal direction is input to the input shaft 30 or when the torque in the reverse direction is input to the input disc 17, the input-side cam mechanism 51 generates the axial thrust according to the torque and an inclination angle of the cam faces 51d. This will be roughly described. When the input torque is Tin, the number of cam rollers 51c is n, and a radius at the first rotary member 51a and the second rotary member 51b in a position where the cam roller 51c is provided is r, a load Ft in the circumferential direction (in a direction of a tangent) in a position where the cam roller 51c is pinched can be expressed by the following expression 1.

$$Ft = Tin/(n \cdot r) \quad (1)$$

When the inclination angle of the cam faces 51d is α, the thrust Fa acting in the axial direction can be expressed by the following expression 2.

$$Fa = Ft/\tan(\alpha/2) \quad (2)$$

The thrust generated by the input-side cam mechanism 51 acts toward the input disc 17 and the input hub 32. Here, the input shaft 30 is connected at axial one end thereof to the first helical gear 71 in the second group 70 of helical gears through splines SP2. Furthermore, the first helical gear 71 is prevented by a thrust bearing TB3 (described later) and the second disc portion 21d of the central shaft 21 from axially moving toward the second disc portion 21d with respect to the central shaft 21. Therefore, an axial force in the input shaft 30 and toward the second disc portion 21d is transmitted to the first helical gear 71, the thrust bearing TB3, and the second disc portion 21d via the splines SP2. Therefore, the thrust of the input-side cam mechanism 51 and acting toward the input hub 32 can be born by a reaction force of the thrust bearing TB3 and the second disc portion 21d of the central shaft 21. In other words, the thrust bearing TB3 and the second disc portion 21d of the central shaft 21 perform a function as a reaction force generating portion (first reaction force generating portion) for generating the reaction force for bearing the thrust. The thrust of the input-side cam mechanism 51 and acting toward the input disc 17 (i.e., the axial pressing force for pressing the input disc 17 toward the output disc 18) is successively transmitted to the output disc 18, the output-side cam mechanism 52, and the output shaft 40 via the respective planetary balls 14. Here, axial one end of the output shaft 40 is in contact with a thrust bearing TB1 (described later) and cannot move axially toward the thrust bearing TB1 with respect to the central shaft 21. Therefore, the thrust (pressing force) can be born by a reaction force of the thrust bearing TB1 and the first disc portion 21c. In other words, the thrust bearing TB1 and the first disc portion 21c perform a function as a reaction force generating portion (second reaction force generating portion) for generating the reaction force for bearing the thrust (pressing force). Therefore, the thrust generated by the input-side cam mechanism 51 can push the input disc 17 against the respective planetary balls 14 and can push the output disc 18 against the respective planetary balls 14. Because the first reaction force generating portion and the second reaction force generating portion are formed by using existing parts of the conventional continuously variable transmission, it is unnecessary to separately prepare new parts for the first reaction force generating portion and the second reaction force generating portion, which makes the continuously variable transmission 1 compact. As a result, a degree of freedom in installation of the continuously variable transmission 1 increases and a range of application of the continuously variable transmission 1 broadens.

The output-side cam mechanism 52 has a similar structure to the input-side cam mechanism 51. In other words, the output-side cam mechanism 52 includes a first rotary member 52a, a second rotary member 52b, cam rollers 52c, and cam faces 52d. Here, the first rotary member 52a is disposed to rotate integrally with the radially outer end portion of the output disc 18 and the second rotary member 52b is disposed to rotate integrally with the annular end face of the second cylindrical portion 40c. In this way, in the output-side cam mechanism 52, when torque in the normal direction is input to the output disc 18 or when torque in the reverse direction is input to the output shaft 40, an interval between the respective cam faces 52d narrows and the respective cam faces 52d push the cam rollers 52c against each other to be integrated with each other. Therefore, in the output-side cam mechanism 52, when the torque in the normal direction is input to the output disc 18, the torque is transmitted from the output disc 18 to the output shaft 40. When the torque in the reverse direction is input to the output shaft 40, the torque is transmitted from the output shaft 40 to the output disc 18. When the torque in the normal direction is input to the output disc 18 or when the torque in the reverse direction is input to the output shaft 40, the output-side cam mechanism 52 generates an axial thrust according to the torque and an inclination angle of the cam faces 52d.

The thrust generated by the output-side cam mechanism 52 acts toward the output disc 18 and the output shaft 40. The thrust of the output-side cam mechanism 52 and acting toward the output disc 18 (i.e., an axial pressing force for pressing the output disc 18 toward the input disc 17) is successively transmitted to the input disc 17, the input-side cam mechanism 51, and the input shaft 30 via the respective planetary balls 14. The thrust (pressing force) can be born by the reaction force of the first reaction force generating portion (the thrust bearing TB3 and the second disc portion 21d of the central shaft 21). On the other hand, the thrust of the output-side cam mechanism 52 and acting toward the output shaft 40 can be born by the reaction force of the second reaction force generating portion (the thrust bearing TB1 and the first disc portion 21c of the central shaft 21). Therefore, the thrust generated by the output-side cam mechanism 52 can push the output disc 18 against the respective planetary balls 14 and can push the input disc 17 against the respective planetary balls 14.

As described above, in the continuously variable transmission mechanism 10, the input disc 17 and the output disc 18 are pushed against the respective planetary balls 14 according to the torque on each of the input and output sides.

In the input-side cam mechanism 51, at portions of the respective cam faces 51d where the axial interval between the cam faces 51d is the widest, lock faces 51e are formed each for locking the cam roller 51c which has rolled on the cam face 51d when the torque in the reverse direction is input to the input shaft 30 or when the torque in the normal direction is input to the input disc 17. As a result, the input-side cam mechanism 51 cannot generate the axial thrust at this time but can integrate the first rotary member 51a and the second rotary member 51b to rotate them in the same direction according to the torque. The lock faces 51e prevent the cam rollers 51c from falling off. Similar lock faces 52e are provided to the output-side cam mechanism 52 as well. Therefore, when the torque in the reverse direction is input to the output disc 18 or when the torque in the normal direction is input to the output shaft 40, the output-side cam mechanism 52 cannot generate the axial thrust but can integrate the first rotary member 52a and the second rotary member 52b to rotate them in the same direction according to the torque.

The input shaft 30 in the embodiment includes a torque input member 31 to which the torque is input from outside and the input hub 32 as an input torque transmitting member for transmitting the input torque transmitted from the torque input member 31 to the continuously variable transmission mechanism 10 and transmits the input torque to the input disc 17 of the continuously variable transmission mechanism 10 via the input-side cam mechanism 51.

The torque input member 31 is made up of a cylindrical portion 31a having the rotation axis X as its central axis, a flange-like first annular portion 31b having one end of the cylindrical portion 31a on its inner peripheral side and extending radially outward, and a flange-like second annular portion 31c having the other end of the cylindrical portion 31a on its outer peripheral side and extending radially inward. In the torque input member 31, the first annular portion 31b is disposed on the continuously variable transmission mechanism 10 side (the left side of the plane of the paper of FIG. 1).

An inner peripheral face of the first helical gear 71 of the second group 70 of helical gears (described later) is fitted over an outer peripheral face of the cylindrical portion 31a through the splines SP2 (described later). The torque input member 31 is supported at an inner peripheral face of the cylindrical portion 31a on the central shaft 21 with the radial bearings RB1 and RB2 interposed therebetween so that the torque input member 31 can rotate with respect to the central shaft 21.

An annular wall face of the second annular portion 31c on the continuously variable transmission mechanism 10 side (left side of the plane of the paper of FIG. 1) faces an annular wall face of the radial bearing RB1 in the axial direction and an annular wall face of the second annular portion 31c on an opposite side (right side of the plane of the paper of FIG. 1) faces an annular wall face formed of the second disc portion 21d of the central shaft 21 in the axial direction. In other words, the second annular portion 31c is in a position sandwiched between the radial bearing RB1 and the second disc portion 21d of the central shaft 21 in the axial direction. Here, in the second annular portion 31c, the annular wall face on the continuously variable transmission mechanism 10 side is in contact with the annular wall face of the radial bearing RB1. On the other hand, such a minute space is provided between the opposite annular wall face of the second annular portion 31c and the second disc portion 21d of the central shaft 21 that the annular wall face does not come in contact with the second disc portion 21d in order to prevent wear loss during the relative rotation.

On the other hand, the input hub 32 is made up of the cylindrical portion 32a having the rotation axis X as the central axis and the flange-like annular portion 32b having one end of the cylindrical portion 32a on the torque input member 31 side on its outer peripheral side and extending radially inward. The cylindrical portion 32a is formed to have an outer diameter substantially equal to the outer diameter of the first annular portion 31b of the torque input member 31. The input hub 32 is connected to the torque input member 31 through the respective annular wall faces of the annular portion 32b and the first annular portion 31b so as to rotate integrally with the torque input member 31.

Here, the input shaft 30 in this state is supported at its one end on the torque input member 31 side. Therefore, in order to achieve distribution of the load and smooth rotation by both-end support, the input shaft 30 is provided with a support member 33 for supporting an open end of the input hub 32.

The support member 33 is made up of a cylindrical portion 33a having the rotation axis X as its central axis, a flange-like first annular portion 33b having one end on the input hub 32 side of the cylindrical portion 33a on its inner peripheral side and extending radially outward, and a flange-like second annular portion 33c having the other end of the cylindrical portion 33a on its inner peripheral side and extending radially inward. The first annular portion 33b is formed to have substantially the same outer diameter as the cylindrical portion 32a of the input hub 32. The support member 33 is connected to the open end of the cylindrical portion 32a of the input hub 32 through its first annular portion 33b so as to rotate integrally with the input hub 32. The support member 33 is supported at an inner peripheral face of the cylindrical portion 33a and through a radial bearing RB3 on an outer peripheral face of a cylindrical portion 61a of a first helical gear 61 in a first group 60 of helical gears (described later) so as to be rotatable with respect to the cylindrical portion 61a. In other words, the input shaft 30 is supported through the radial bearings RB1, RB2, and RB3.

Furthermore, the second annular portion 33c is provided so that its annular wall face on the continuously variable transmission mechanism 10 side is in contact with an annular wall face of the radial bearing RB3. In this contact state, a snap ring SR (described later) is in contact with an axially opposite annular wall face of the radial bearing RB3.

The output shaft 40 in the embodiment is an output hub for outputting output torque, transmitted from the output disc 18 of the continuously variable transmission mechanism 10 via the output-side cam mechanism 52, to the outside. The output shaft 40 is disposed to face the torque input member 31 of the input shaft 30 in the axial direction with the continuously variable transmission mechanism 10 interposed therebetween.

The output shaft 40 is made up of a first cylindrical portion 40a having the rotation axis X as its central axis, a flange-like first annular portion 40b having one end on the continuously variable transmission mechanism 10 side of the first cylindrical portion 40a on its inner peripheral side and extending radially outward, the second cylindrical portion 40c extending from an outer peripheral end portion of the first annular portion 40b toward the continuously variable transmission mechanism 10, and the flange-like second annular portion 40d having the other end of the first cylindrical portion 40a on its outer peripheral side and extending radially inward.

The first cylindrical portion 40a is disposed radially inside the support member 33 of the input shaft 30 and an inner peripheral face of the first helical gear 61 is fitted over an outer peripheral face of the first cylindrical portion 40a through splines SP1 (described later). The output shaft 40 is supported at an inner peripheral face of the first cylindrical portion 40a on the central shaft 21 through radial bearings RB4 and RB5 so as to be rotatable with respect to the central shaft 21.

The first annular portion 40b is disposed on the continuously variable transmission mechanism 10 side of the support member 33 of the input shaft 30 and the second cylindrical portion 40c is disposed radially inside the input hub 32 of the input shaft 30. Here, the first annular portion 40b and the second cylindrical portion 40c are formed to have outer diameters substantially equal to the outer diameter of the output disc 18. In other words, the first annular portion 40b and the second cylindrical portion 40c are formed to have outer diameters slightly smaller than the inner diameter of the cylindrical portion 32a of the input hub 32.

Furthermore, an annular wall face of the second annular portion 40d on the continuously variable transmission mechanism 10 side (right side of a plane of paper of FIG. 1) faces an annular wall face of the radial bearing RB5 in the axial direction and an annular wall face of the second annular portion 40d on an opposite side (left side of the plane of the paper of FIG. 1) faces an annular wall face formed of the first disc portion 21c of the central shaft 21 in the axial direction. In other words, the second annular portion 40d is in a position sandwiched between the radial bearing RB5 and the first disc portion 21c of the central shaft 21 in the axial direction. Here, in the second annular portion 40d, the annular wall face on the continuously variable transmission mechanism 10 side is in contact with the annular wall face of the radial bearing RB5. On the other hand, a thrust bearing TB1 is disposed between the annular wall face on the opposite side and the annular wall face formed of the first disc portion 21c. The thrust bearing TB1 is a member which allows the output shaft 40 to rotate with respect to the central shaft 21 but does not allow the output shaft 40 to axially move toward the first disc portion 21c with respect to the central shaft 21. Therefore, the output shaft 40 is prevented, by its second annular portion 40d, the thrust bearing TB1, and the first disc portion 21c, from moving with respect to the central shaft 21 in an axial opposite direction (toward the left side of the plane of the paper of FIG. 1) to a direction of pushing the output disc 18 against the respective planetary balls 14. Therefore, if a force in the axial direction (toward the left side of the plane of the paper of FIG. 1) of the output shaft 40 acts on the output shaft 40 due to the thrust of the output-side cam mechanism 52, for example, the force is born by the reaction force of the second reaction force generating portion (the thrust bearing TB1 and the disc portion 21c of the central shaft 21) as described above.

Here, between the respective annular wall faces of the first annular portion 40b of the output shaft 40 and the first annular portion 33b of the support member 33 of the input shaft 30, a thrust bearing TB2 for allowing rotation of the output shaft 40 and the input shaft 30 with respect to each other is disposed.

To the output shaft 40, the first group 60 of helical gears engaged with each other is mounted. The first group 60 of helical gears is made up of a pair of helical gears engaged with each other and includes the first helical gear 61 for rotating coaxially and integrally with the output shaft 40 and a second helical gear 62 engaged with the first helical gear 61. The first group 60 of helical gears generates a thrust (thrust force) in such a direction (toward the right side of the plane of the paper of FIG. 1 in the axial direction) as to push the output disc 18 against the respective planetary balls 14 from the first helical gear 61 when the output shaft 40 is rotating in the normal direction. On the other hand, when the output shaft 40 is rotating in the reverse direction, the first group 60 of helical gears generates a thrust (thrust force) in the opposite direction (toward the left side of the plane of the paper in FIG. 1) opposite to the thrust from the first helical gear 61. In other words, the first group 60 of helical gears forms a generating portion of the axial force (the second axial force generating portion) for generating the thrust in such an axial direction as to push the output disc 18 toward the input disc 17 by rotating in one direction (rotating in the normal direction) while generating the opposite force in the axial direction opposite to the thrust by rotating in the other direction (rotating in the reverse direction).

The first helical gear 61 has the cylindrical portion 61a having the rotation axis X as its central axis and a gear portion 61b is formed at one end in the axial direction of the cylindrical portion 61a. In the first helical gear 61, the cylindrical portion 61a is positioned on the continuously variable transmission 10 side (right side of the plane of the paper of FIG. 1) of the gear portion 61b.

Here, the cylindrical portion 61a and the gear portion 61b have inner peripheral faces facing the outer peripheral face of the first cylindrical portion 40a of the output shaft 40 in the radial direction and have inner diameters substantially equal to an outer diameter of the first cylindrical portion 40a of the output shaft 40. In the embodiment, the splines SP1 to be engaged with each other are formed on the inner peripheral faces of the cylindrical portion 61a and the gear portion 61b (i.e., the inner peripheral face of the first helical gear 61) and the outer peripheral faces of the first cylindrical portion 40a, and first helical gear 61 and the first cylindrical portion 40a are fitted with each other through the splines SP1. The splines SP1 cause the first helical gear 61 to rotate integrally with the output shaft 40. Moreover, the splines SP1 transmit the thrust in the normal rotation of the first helical gear 61 to the output shaft 40 when the first helical gear 61 is rotating in the normal direction with the output shaft 40.

An outer peripheral face of the cylindrical portion 61a of the first helical gear 61 faces the inner peripheral face of the cylindrical portion 33a of the support member 33 of the input shaft 30 in the radial direction. As described above, between the outer peripheral face of the cylindrical portion 61a and the inner peripheral face of the cylindrical portion 33a, the radial bearing RB3 is disposed. In other words, the radial bearing RB3 is disposed in such a position that one annular wall face (on the right side of the plane of the paper of FIG. 1) of the radial bearing RB3 faces the first annular portion 40b of the output shaft 40 and the other annular wall face (on the left side of the plane of the paper of FIG. 1) faces the gear portion 61b. Here, an annular wall face of the second annular portion 33c of the support member 33 of the input shaft 30 is in contact with the other annular wall face of the radial bearing RB3 in a stationary state of the first helical gear 61. The cylindrical portion 61a is provided with an annular member for coming in contact with the one annular wall face of the radial bearing RB3 in this state. The annular member has a larger outer diameter than the outer peripheral face of the cylindrical portion 61a and is disposed not to be movable at least in the axial direction with respect to the cylindrical portion 61a. The annular member may be a member formed integrally with the cylindrical portion 61a or a separate member mounted to the cylindrical portion 61a. As the annular member, the snap ring SR disposed in an annular groove formed in the outer peripheral face of the cylindrical portion 61a is used here, for example. In this manner, the radial bearing RB3 is sandwiched in the axial direction between the second annular portion 33c of the support member 33 of the input shaft 30 and the snap ring SR provided to the first helical gear 61.

The first helical gear 61 generates the thrust for pushing the output disc 18 against the respective planetary balls 14 (toward the right side of the plane of the paper of FIG. 1 in the axial direction) when the output shaft 40 is rotating in the normal direction. Therefore, the first helical gear 61 in this case transmits the thrust to the output shaft 40 through the splines SP1 and presses the output shaft 40 in the same direction as the thrust. The force in the axial direction of the output shaft 40 and caused by the pressing acts as the pressing force for pressing the output disc 18 toward the input disc 17 and is transmitted to the output disc 18, the respective planetary balls 14, the input disc 17, the input-side cam mechanism 51, and the input shaft 30 through the output-side cam mechanism 52. Therefore, the pressing force is born by the reaction force of the first reaction force generating portion (the thrust bearing TB3 and the second disc portion 21d of the central shaft 21). As a result, in the normal rotation of the output shaft 40, the thrust of the first helical gear 61 can push the output disc 18 against the respective planetary balls 14 and push the input disc 17 against the respective planetary balls 14.

On the other hand, when the output shaft 40 is rotating reversely, the first helical gear 61 generates the thrust in the opposite axial direction (toward the left side of the plane of the paper of FIG. 1). Because the first helical gear 61 is not locked to the output shaft 40 in the axial direction by workings of the splines SP1, the axial force caused by the thrust of the first helical gear 61 does not act on the output shaft 40. In this case, the output shaft 40 cannot push the output disc 18 against the respective planetary balls 14 by the thrust of the first group 60 of helical gears (the first helical gear 61 and the second helical gear 62). Even if the thrust of the first helical gear 61 can be transmitted to the output shaft 40, movement of the output shaft 40 in the direction of the thrust with respect to the central shaft 21 is restricted by the thrust bearing TB1 and the first disc portion 21c in the continuously variable transmission 1 and therefore the output shaft 40 does not exert the axial force on the output disc 18.

However, the thrust of the first helical gear 61 is similarly acting on the snap ring SR and therefore, the thrust is transmitted to the radial bearing RB3 through the snap ring SR and to the input shaft 30 through the second annular portion 33c in contact with the radial bearing RB3. Therefore, the thrust in the axial direction (toward the left side of the plane of the paper of FIG. 1) and transmitted to the input shaft 30 acts as the pressing force for pressing the input disc 17 toward the output disc 18 and is transmitted from the annular portion 32b of the input hub 32 to the input disc 17, the respective planetary balls 14, the output disc 18, the output-side cam mechanism 52, the output shaft 40, the thrust bearing TB1, and the first disc portion 21c of the central shaft 21 via the input-side cam mechanism 51. Therefore, the pressing force is born by the reaction force of the second reaction force generating portion (the thrust bearing TB1 and the first disc portion 21c). As a result, in the reverse rotation of the output shaft 40, the thrust force of the first helical gear 61 in the reverse direction can push the output disc 18 against the respective planetary balls 14 and push the input disc 17 against the respective planetary balls 14.

In this manner, in the continuously variable transmission 1, it is possible to generate the force for pushing the output disc 18 against the respective planetary balls 14 and the force for pushing the input disc 17 against the respective planetary balls 14 by means of the thrust of the first group 60 of helical gears (the first helical gear 61 and the second helical gear 62) even in the reverse rotation of the output shaft 40. In other words, in the continuously variable transmission 1, in the reverse rotation of the output shaft 40 (i.e., when the axial thrust of the first group 60 of helical gears is in the opposite direction), the input shaft 30, the radial bearing RB3, and the snap ring SR function as the first opposite axial force transmitting portion for transmitting the thrust to the input disc 17. In the continuously variable transmission 1, the first opposite axial force transmitting portion can generate the pressing forces for pressing the input disc 17 and the output disc 18 against the respective planetary balls 14 in the reverse rotation of the output shaft 40.

Furthermore, in the continuously variable transmission 1 in the embodiment, the similar second group 70 of helical gears is mounted to the input shaft 30. The second group 70 of helical gears is made up of a pair of helical gears engaged with each other and includes the first helical gear 71 for rotating coaxially and integrally with the input shaft 30 and a second helical gear 72 engaged with the first helical gear 71. The second group 70 of helical gears generates a thrust (thrust force) in such a direction (toward the left side of the plane of the paper of FIG. 1 in the axial direction) as to push the input disc 17 against the respective planetary balls 14 from the first helical gear 71 when the input shaft 30 is rotating in the normal direction. On the other hand, when the input shaft 30 is rotating in the reverse direction, the second group 70 of helical gears generates a thrust (thrust force) in the opposite direction (toward the right side of the plane of the paper in FIG. 1) opposite to the thrust (thrust force) from the first helical gear 71. In other words, the second group 70 of helical gears forms a generating portion of the axial force (the first axial force generating portion) for generating the thrust in such an axial direction as to push the input disc 17 toward the output disc 18 by rotating in one direction (rotating in the normal direction) while generating the opposite force in the axial direction opposite to the thrust by rotating in the other direction (rotating in the reverse direction).

In the embodiment, the splines SP2 to be engaged with each other are formed on the inner peripheral face of the first helical gear 71 and the outer peripheral face of the cylindrical portion 31*a* of the torque input member 31 and the first helical gear 71 and the cylindrical portion 31*a* are fitted with each other through the splines SP2. The splines SP2 cause the first helical gear 71 to rotate integrally with the input shaft 30. Moreover, the splines SP2 transmit the thrust in the normal rotation of the first helical gear 71 to the input shaft 30 when the first helical gear 71 is rotating in the normal direction with the input shaft 30. Here, to transmit the axial force from the input shaft 30 to the first helical gear 71 with high responsiveness, axial clearances on the continuously variable transmission mechanism 10 side of the respective splines SP2 are reduced.

Here, the splines SP2 of the cylindrical portion 31*a* are formed on the outer peripheral face at an end portion on the second disc portion 21*d* side. In a state in which the first helical gear 71 is not rotating, a face of the first helical gear 71 facing the second disc portion 21*d* is disposed slightly closer to the second disc portion 21*d* than a face of the cylindrical portion 31*a* facing the second disc portion 21*d*. Between the opposed faces of the first helical gear 71 and the second disc portion 21*d*, the thrust bearing TB3 is disposed. The thrust bearing TB3 is a member for allowing the first helical gear 71 to rotate with respect to the central shaft 21 and for not allowing the first helical gear 71 to axially move toward the second disc portion 21*d* with respect to the central shaft 21. Therefore, when the axial force toward the second disc portion 21*d* acts on the input shaft 30 due to the thrust or the like of the input-side cam mechanism 51, for example, the force is born by the reaction force of the first reaction force generating portion (the thrust bearing TB3 and the second disc portion 21*d* of the central shaft 21) as described above.

The first helical gear 71 generates the thrust for pushing the input disc 17 against the respective planetary balls 14 (toward the left side of the plane of the paper of FIG. 1 in the axial direction) when the input shaft 30 is rotating in the normal direction. Therefore, the first helical gear 71 in this case transmits the thrust to the input shaft 30 through the splines SP2 and presses the input shaft 30 in the same direction as the thrust. The force in the axial direction of the input shaft 30 and caused by the pressing acts as the pressing force for pressing the input disc 17 toward the output disc 18 and is transmitted to the input disc 17, the respective planetary balls 14, the output disc 18, the output-side cam mechanism 52, and the output shaft 40 through the input-side cam mechanism 51. Therefore, the pressing force is born by the reaction force of the second reaction force generating portion (the thrust bearing TB1 and the first disc portion 21*c* of the central shaft 21). As a result, in the normal rotation of the input shaft 30, by means of the thrust of the first helical gear 71, the input disc 17 can be pushed against the respective planetary balls 14 and the output disc 18 can be pushed against the respective planetary balls 14.

On the other hand, when the input shaft 30 is rotating reversely, the first helical gear 71 generates the thrust in the opposite axial direction (toward the right side of the plane of the paper of FIG. 1), but the thrust does not act on the input shaft 30 due to workings of the splines SP2. Therefore, in this case, even if the second group 70 of helical gears (the first helical gear 71 and the second helical gear 72) generates the thrust, the input shaft 30 does not exert the axial force on the input disc 17.

However, the axial opposite thrust (toward the right side of the plane of the paper of FIG. 1) is transmitted to the second disc portion 21*d* through the thrust bearing TB3 and the first helical gear 71 presses the second disc portion 21*d* through the thrust bearing TB3 in the direction of the thrust. The pressing force acts as the force in the axial direction of the central shaft 21 and presses the output shaft 40 against the first disc portion 21*c* on the opposite side through the thrust bearing TB1. The pressing force applied to the output shaft 40 acts as the pressing force for pressing the output disc 18 toward the input disc 17, is transmitted from the second cylindrical portion 40*c* of the output shaft 40 to the output disc 18, the respective planetary balls 14, the input disc 17, the input-side cam mechanism 51, and the input shaft 30 via the output-side cam mechanism 52, and is further transmitted to the first helical gear 71, the thrust bearing TB3, and the second disc portion 21*d* of the central shaft 21 through the splines SP2. Therefore, the pressing force is born by the reaction force of the first reaction force generating portion (the thrust bearing TB3 and the second disc portion 21*d* of the central shaft 21). As a result, in the reverse rotation of the input shaft 30, by means of the thrust of the first helical gear 71 in the reverse rotation, the output disc 18 can be pushed against the respective planetary balls 14 and the input disc 17 can be pushed against the respective planetary balls 14.

In this manner, in the continuously variable transmission 1, it is possible to generate the force for pushing the output disc 18 against the respective planetary balls 14 and the force for pushing the input disc 17 against the respective planetary balls 14 by means of the thrust of the second group 70 of helical gears (the first helical gear 71 and the second helical gear 72) even in the reverse rotation of the input shaft 30. In other words, in the continuously variable transmission 1, in the reverse rotation of the input shaft 30 (i.e., when the axial thrust of the second group 70 of helical gears is in the opposite direction), the thrust bearing TB3, the second disc portion 21d and the first disc portion 21c of the central shaft 21, and the output shaft 40 function as the second opposite axial force transmitting portion for transmitting the thrust to the output disc 18. In the continuously variable transmission 1, the second opposite axial force transmitting portion can generate the pressing forces for pressing the input disc 17 and the output disc 18 against the respective planetary balls 14 in the reverse rotation of the input shaft 30.

In the continuously variable transmission 1 in the embodiment formed as described above, if the torque is input to the input shaft 30, the input shaft 30 rotates with respect to the central shaft 21 according to the rotating direction of the torque. Because the input disc 17 is connected to the input shaft 30 with the input-side cam mechanism 51 interposed therebetween, the input disc 17 rotates together with the input shaft 30 and the input-side cam mechanism 51 in the same direction as the input shaft 30 with respect to the central shaft 21.

For example, when the input shaft 30 is rotating in the normal direction as when the torque in the normal direction is input to the input shaft 30, the thrust toward the input disc 17 and the thrust toward the annular portion 32b of the input hub 32 are generated in the input-side cam mechanism 51. As described above, in this case, by means of the thrust of the input-side cam mechanism 51, the reaction force of the first reaction force generating portion (the thrust bearing TB3 and the second disc portion 21d of the central shaft 21), and the reaction force of the second reaction force generating portion (the thrust bearing TB1 and the first disc portion 21c of the central shaft 21), the input disc 17 and the output disc 18 can be pushed against the respective planetary balls 14. Here, the thrust of the input-side cam mechanism 51 is of magnitude according to the torque of the input shaft 30.

Furthermore, as the input shaft 30 rotates, the first helical gear 71 fitted through the splines also rotates in the same direction. Therefore, by working between the first helical gear 71 and the second helical gear 72 engaged with each other, an axial thrust according to the rotating direction is generated on the first helical gear 71. In the normal rotation of the input shaft 30, the thrust of the first helical gear 71 acts in such a direction as to push the input disc 17 against the respective planetary balls 14. As described above, at this time, by means of the thrust of the first helical gear 71, the reaction force of the first reaction force generating portion (the thrust bearing TB3 and the second disc portion 21d of the central shaft 21), and the reaction force of the second reaction force generating portion (the thrust bearing TB1 and the first disc portion 21c of the central shaft 21), the input disc 17 and the output disc 18 are pushed against the respective planetary balls 14.

As a result, in the normal rotation of the input shaft 30, the frictional forces are generated between the contact face 17a of the input disc 17 and the outer peripheral faces of the respective planetary balls 14. Therefore, by means of the frictional forces, the torque is transmitted to the respective planetary balls 14 from the input disc 17.

At this time, the respective planetary balls 14 are rotatably supported by the support shafts 14a passing through the centers of the planetary balls 14 and the idler roller 13 and therefore rotate on their axes due to the torque transmitted from the input disc 17. The idler roller 13 rotates about the rotation axis X as the planetary balls 14 rotate about their axes. The respective planetary balls 14 rotating about their axes are in contact at their outer peripheral faces with the contact face 18a of the output disc 18. Therefore, frictional forces are also generated at the contact portions and therefore, by the frictional forces, the torque is transmitted to the output disc 18 from the respective planetary balls 14. The output disc 18 is caused to rotate in the same direction as the input shaft 30 and the input disc 17 with respect to the central shaft 21 by the torque from the respective planetary balls 14.

The output shaft 40 is connected to the output disc 18 with the output-side cam mechanism 52 interposed therebetween. Therefore, the output-side cam mechanism 52 and the output shaft 40 also rotate in the same direction as the output disc 18 with respect to the central shaft 21. At this time, in the output-side cam mechanism 52, a thrust toward the output disc 18 and a thrust toward the output shaft 40 are generated in the normal rotation of the input shaft 30. The thrusts are of magnitude according to the torque of the output disc 18. As described above, in such a case, by means of the thrust of the output-side cam mechanism 52, the reaction force of the first reaction force generating portion (the thrust bearing TB3 and the second disc portion 21d of the central shaft 21), and the reaction force of the second reaction force generating portion (the thrust bearing TB1 and the first disc portion 21c of the central shaft 21), the input disc 17 and the output disc 18 are pushed against the respective planetary balls 14.

Moreover, at this time, the first helical gear 61 fitted by the splines also rotates in the same direction as the output shaft 40 rotates. Therefore, by working between the first helical gear 61 and the second helical gear 62 engaged with each other, an axial thrust according to the rotating direction is generated on the first helical gear 61. Because the output shaft 40 rotates in the normal direction in the normal rotation of the input shaft 30, the thrust of the first helical gear 61 acts in such a direction as to push the output disc 18 against the respective planetary balls 14. As described above, at this time, by means of the thrust of the first helical gear 61, the reaction force of the first reaction force generating portion (the thrust bearing TB3 and the second disc portion 21d of the central shaft 21), and the reaction force of the second reaction force generating portion (the thrust bearing TB1 and the first disc portion 21c of the central shaft 21), the input disc 17 and the output disc 18 are pushed against the respective planetary balls 14.

As described above, according to the continuously variable transmission 1 in the embodiment, in the normal rotation of the input shaft 30, it is possible to push the input disc 17 and the output disc 18 against the respective planetary balls 14 with suitable strength by means of the thrust of the input-side cam mechanism 51, the thrust of the output-side cam mechanism 52, the thrust of the first group 60 of helical gears (the first helical gear 61 and the second helical gear 62), the thrust of the second group 70 of helical gears (the first helical gear 71 and the second helical gear 72), the reaction force of the first reaction force generating portion (the thrust bearing TB3 and the second disc portion 21d of the central shaft 21), and the reaction force of the second reaction force generating portion (the thrust bearing TB1 and the first disc portion 21c of the central shaft 21). The suitable strength is such strength as to generate forces for sandwiching the respective planetary balls 14 between the input disc 17 and the output disc 18 and strong enough at least to secure a desired transmission torque capacity. As a result, in the continuously variable transmission mechanism 10, desired contact pressure can be generated between the input disc 17 and the output disc 18, and the respective planetary balls 14 and the transmission torque capacity according to the contact pressure can be secured. Therefore, in the continuously variable transmission 1, the torque input to the input shaft 30 is adjusted to the torque according to the transmission torque capacity and transmitted to the output shaft 40. The transmission torque capacity is set according to the respective thrusts, friction coefficients between the first rotary member 51a and the second rotary member 51*b*, and the cam rollers 51*c* and friction coefficients between the first rotary member 52*a* and the second rotary member 52*b*, and the cam rollers 52*c*.

The torque transmitted to the output shaft 40 is, in other words, the torque of the input shaft 30 which is increased or decreased according to the transmission gear ratio of the continuously variable transmission mechanism 10. In the continuously variable transmission mechanism 10, the transmission gear ratio is a ratio according to the tilting angle at which the planetary balls 14 tilt with the support shafts 14*a*. Therefore, in the continuously variable transmission 1, the respective planetary balls 14 are tilted by axially moving the idler plate 11 for supporting the idler roller 13 for rotation by means of the shift mechanism 20 to thereby continuously vary the transmission gear ratio which is a ratio between the numbers of rotations of the input shaft 30 and the output shaft 40.

In the continuously variable transmission mechanism 10, if the input disc 17 and the output disc 18 have the same radiuses and when the support shafts 14*a* is parallel to the central shaft 21, the radius (contact radius) at a position where the contact face 17*a* of the input disc 17 is in contact with the outer peripheral face of each of the planetary balls 14 from the rotation axis X and the radius (contact radius) at a position where the contact face 18*a* of the output disc 18 is in contact with the outer peripheral face of each of the planetary balls 14 from the rotation axis X become the same and the transmission gear ratio is "1".

Figure 5:
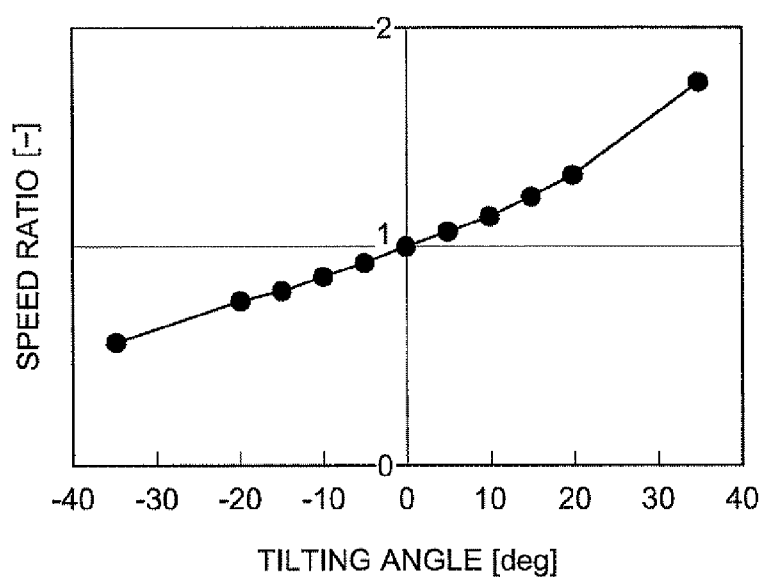
FIG. 5 is a diagram showing a relationship between a tilting angle of planetary balls included in the continuously variable transmission according to the present invention and a transmission gear ratio (speed ratio)

On the other hand, in the continuously variable transmission mechanism 10, when the support shafts 14*a* is tilted with respect to the central shaft 21 as a result of operation of the shift mechanism 20, either one of the contact radius between the input disc 17 and each of the planetary balls 14 and the contact radius between the output disc 18 and each of the planetary balls 14 increases according to the tilting angle of each of the planetary balls 14 while the other decreases according to the tilting angle. Therefore, in the continuously variable transmission mechanism 10, the number of rotations of the output disc 18 with respect to the number of rotations of the input disc 17 changes according to the changes of the contact radiuses. Consequently, the transmission gear ratio which is the ratio between these numbers of rotations varies according to the tilting angle as shown in FIG. 5. In FIG. 5, the number of rotations of the output disc 18 when the number of rotations of the input disc 17 is "1" is plotted for each tilting angle and the respective points are connected with a line.

Next, a case in which the output shaft 40 is rotating in the reverse direction as when the torque in the reverse direction is input to the output shaft 40 will be described.

In this case, the output-side cam mechanism 52 and the output disc 18 rotate with the output shaft 40 in the reverse direction with respect to the central shaft 21. At this time, in the output-side cam mechanism 52, the same thrust as when the input shaft 30 is rotating in the normal direction is generated. Therefore, at this time, by means of the thrust of the output-side cam mechanism 52, the reaction force of the first reaction force generating portion (the thrust bearing TB3 and the second disc portion 21*d* of the central shaft 21), and the reaction force of the second reaction force generating portion (the thrust bearing TB1 and the first disc portion 21*c* of the central shaft 21), the input disc 17 and the output disc 18 are pushed against the respective planetary balls 14. Here, the thrust of the output-side cam mechanism 52 is of magnitude according to the torque of the output shaft 40.

Furthermore, during the reverse rotation of the output shaft 40, the first helical gear 61 fitted by the splines also rotates in the same direction as the output shaft 40 rotates. Therefore, by working between the first helical gear 61 and the second helical gear 62 engaged with each other, the thrust in such a direction as to move the output disc 18 away from the respective planetary balls 14 (leftward in the axial direction on the plane of the paper of FIG. 1) is generated on the first helical gear 61.

The thrust of the first helical gear 61 cannot be transmitted to the output shaft 40 through the splines SP1 as described above but can be transmitted to the snap ring SR. Therefore, in the reverse rotation of the output shaft 40, by means of the thrust of the first helical gear 61 in the reverse direction, the reaction force of the first reaction force generating portion (the thrust bearing TB3 and the second disc portion 21*d* of the central shaft 21), and the reaction force of the second reaction force generating portion (the thrust bearing TB1 and the first disc portion 21*c* of the central shaft 21), the input disc 17 and the output disc 18 are pushed against the respective planetary balls 14 as described above.

As a result, the frictional forces are generated between the contact face 18*a* of the output disc 18 and the outer peripheral faces of the respective planetary balls 14 and therefore, by the frictional forces, the torque is transmitted from the output disc 18 to the respective planetary balls 14.

During the reverse rotation of the output shaft 40, the respective planetary balls 14 are caused to rotate on their axes by the torque transmitted from the output disc 18 and rotate the idler roller 13 about the rotation axis X as they rotate on their axes. The respective planetary balls 14 rotating on their axes are in contact at their outer peripheral faces with the contact face 17*a* of the input disc 17. As a result, frictional forces are generated at the contact portions and therefore, the torque is transmitted from the respective planetary balls 14 to the input disc 17 by the frictional forces. The input disc 17 is caused to rotate in the same direction as the output shaft 40 and the output disc 18 with respect to the central shaft 21 by the torque from the respective planetary balls 14. As a result, the input-side cam mechanism 51 and the input shaft 30 also rotate in the same direction as the input disc 17 with respect to the central shaft 21.

At this time, in the input-side cam mechanism 51, the same thrust as in the normal rotation of the input shaft 30 is generated. Therefore, at this time, by means of the thrust of the input-side cam mechanism 51, the reaction force of the first reaction force generating portion (the thrust bearing TB3 and the second disc portion 21*d* of the central shaft 21), and the reaction force of the second reaction force generating portion (the thrust bearing TB1 and the first disc portion 21*c* of the central shaft 21), the input disc 17 and the output disc 18 are pushed against the respective planetary balls 14.

Moreover, at this time, the first helical gear 71 fitted by the splines also rotates in the reverse direction as the input shaft 30 rotates. Therefore, by working between the first helical gear 71 and the second helical gear 72 engaged with each other, a thrust in such a direction (toward the right side in the axial direction on the plane of the paper of FIG. 1) as to move the input disc 17 away from the respective planetary balls 14 is generated on the first helical gear 71.

The thrust of the first helical gear 71 cannot be transmitted to the input shaft 30 through the splines SP2 as described above but can be transmitted to the output shaft 40 via the thrust bearing TB3 and the central shaft 21 and becomes a pressing force for pressing the output disc 18 toward the input disc 17. Therefore, in the reverse rotation of the output shaft 40, by means of the thrust of the first helical gear 71 in the reverse direction, the reaction force of the first reaction force generating portion (the thrust bearing TB3 and the second disc portion 21*d* of the central shaft 21), and the reaction force of the second reaction force generating portion (the thrust bearing TB1 and the first disc portion 21c of the central shaft 21), the input disc 17 and the output disc 18 are pushed against the respective planetary balls 14 as described above.

As described above, according to the continuously variable transmission 1 in the embodiment, during the reverse rotation of the output shaft 40, it is possible to push the input disc 17 and the output disc 18 against the respective planetary balls 14 with suitable strength by means of the thrust of the input-side cam mechanism 51, the thrust of the output-side cam mechanism 52, the thrust by the first group 60 of helical gears (the first helical gear 61 and the second helical gear 62) in the reverse direction, the thrust by the second group 70 of helical gears (the first helical gear 71 and the second helical gear 72) in the reverse direction, the reaction force of the first reaction force generating portion (the thrust bearing TB3 and second disc portion 21d of the central shaft 21), and the reaction force of the second reaction force generating portion (the thrust bearing TB1 and the first disc portion 21c of the central shaft 21). Therefore, in the continuously variable transmission mechanism 10, desired contact pressure can be generated between the input disc 17 and the output disc 18, and the respective planetary balls 14 and a transmission torque capacity according to the contact pressure can be secured. As a result, in the continuously variable transmission 1, the torque input to the output shaft 40 is adjusted to the torque according to the transmission torque capacity and is transmitted to the input shaft 30. In other words, the torque transmitted to the input shaft 30 is obtained by increasing or decreasing the torque input to the output shaft 40 according to the transmission gear ratio of the continuously variable transmission mechanism 10.

Figure 6:
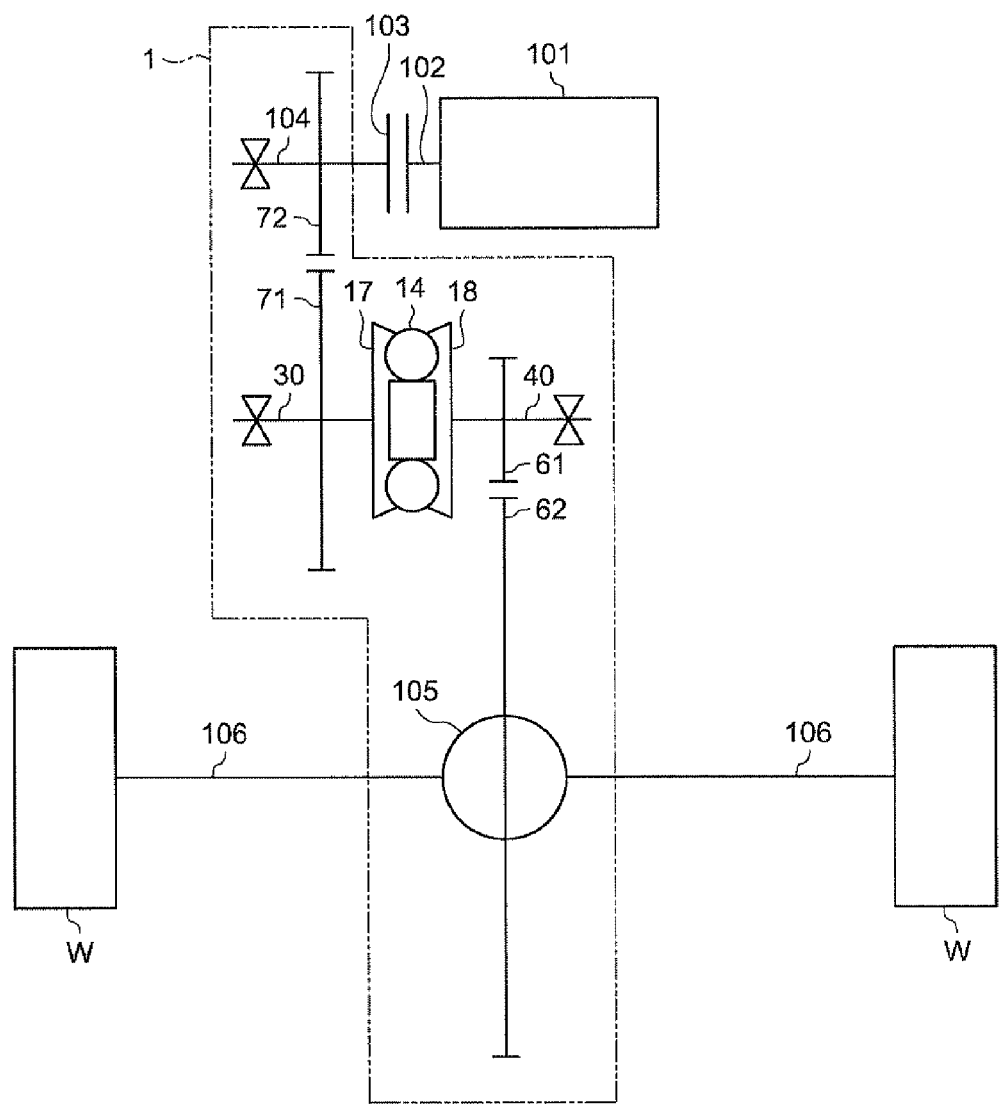
FIG. 6 is a drawing for explaining an example of application of the continuously variable transmission according to the present invention to a transmission of a vehicle.

Here, FIG. 6 shows a concrete example of application of the continuously variable transmission 1 in which the torque in the normal direction is input to the input shaft 30 or the torque in the reverse direction is input to the output shaft 40. As the concrete example, it may be applied to a transmission in a vehicle such as an automobile.

For example, in the vehicle, as shown in FIG. 6, an output shaft 102 of an engine 101 is connected to an input side of a clutch 103 and an output shaft 104 of the clutch 103 is connected as a rotation axis of the second helical gear 72 of the second group 70 of helical gears. Here, in the vehicle, output torque of the engine 101 is input to the input shaft 30 of the continuously variable transmission 1 via the second group 70 of helical gears. Here, the torque input to the input shaft 30 at this time is defined as the torque in the normal direction. In this way, the continuously variable transmission 1 can generate the suitable force for pushing the output disc 18 against the respective planetary balls 14 and the suitable force for pushing the input disc 17 against the respective planetary balls 14 in the normal rotation of the input shaft 30 as described above and therefore the output torque of the engine 101 can be adjusted to the torque according to the transmission torque capacity based on the contact pressure at this time and transmitted to the output shaft 40. In this vehicle, the second helical gear 62 is disposed coaxially with a differential 105 and therefore, the torque of the output shaft 40 transmitted through the first group 60 of helical gears (the first helical gear 61 and the second helical gear 62) is transmitted to left and right axles 106 and wheels W through the differential 105 to carry out forward traveling.

In the vehicle, at the time of deceleration such as a fuel cut of the engine 101, the torque in the reverse direction to that in the forward traveling is input to the first group 60 of helical gears (the first helical gear 61 and the second helical gear 62) through the wheels W, the axles 106, and the differential 105. In other words, the torque in the reverse direction is input to the output shaft 40 at this time. Therefore, in the continuously variable transmission 1 at this time, it is possible to generate a suitable force for pushing the output disc 18 against the respective planetary balls 14 and a suitable force for pushing the input disc 17 against the respective planetary balls 14 even during the reverse rotation, i.e., when the thrust of the first helical gear 61 acts in the reverse direction to that in the forward traveling as described in the above description of the reverse rotation of the output shaft 40 and therefore it is possible to adjust the torque from the wheels W to torque according to the transmission torque capacity based on the contact pressure at this time to transmit it to the input shaft 30. The torque of the input shaft 30 in the reverse direction is transmitted to the clutch 103 via the second group 70 of helical gears (the first helical gear 71 and the second helical gear 72) and transmitted to the output shaft 102 of the engine 101. In this manner, the continuously variable transmission 1 can transmit the torque in the reverse direction from the wheels W to the output shaft 102 of the engine 101 and therefore rotation of the output shaft 102 does not stop in the fuel cut of the engine 101 and the engine 101 can be restarted smoothly. Moreover, because the continuously variable transmission 1 can allow the engine 101 to carry out the fuel cut, it is possible to improve fuel economy. Furthermore, because the continuously variable transmission 1 does not freewheel when the torque in the reverse direction is input from the wheels W to the output shaft 40, i.e., because it can transmit the torque in the reverse direction to the input shaft 30, it is possible to exert what is called engine brake in the vehicle.

In the continuously variable transmission 1 in the embodiment, in the reverse rotation of the input-side cam mechanism 51 as when the torque in the reverse direction is input to the input shaft 30, the input-side cam mechanism 51 cannot generate an axial thrust but can rotate the input disc 17 in the same direction as the input shaft 30. Therefore, in the reverse rotation of the input shaft 30, the thrust of the first helical gear 71 of the second group 70 of helical gears is transmitted to the output shaft 40 via the thrust bearing TB3 and the central shaft 21 to push the input disc 17 and the output disc 18 against the respective planetary balls 14. Therefore, by the frictional forces at the contact portions between the outer peripheral faces of the respective planetary balls 14 and the contact face 17a of the input disc 17, the torque is transmitted from the input disc 17 to the respective planetary balls 14 and the respective planetary balls 14 rotate on their axes. The respective planetary balls 14 rotating on their axes further generate frictional forces between their outer peripheral faces and the contact face 18a of the output disc 18 and therefore transmit the torque to the output disc 18 and rotate the output disc 18 in the same reverse direction as the input shaft 30 and the input disc 17.

At this time, the output-side cam mechanism 52 cannot generate the axial thrust but rotates with the output shaft 40 in the same direction as the output disc 18 with respect to the central shaft 21. In this way, the first helical gear 61 of the first group 60 of helical gears generates the thrust in the reverse rotation. Therefore, in the same manner as in the above-described reverse rotation of the output shaft 40, it is possible to push the input disc 17 and the output disc 18 against the respective planetary balls 14 based on the thrust of the first helical gear 61 and the function of the first opposite axial force transmitting portion.

In other words, during the reverse rotation of the input shaft 30, it is possible to push the input disc 17 and the output disc 18 against the respective planetary balls 14 with suitable strength by means of the thrust by the first group 60 of helical gears (the first helical gear 61 and the second helical gear 62)

in the reverse direction, the thrust of the second group 70 of helical gears (the first helical gear 71 and the second helical gear 72) in the reverse direction, the reaction force of the first reaction force generating portion (the thrust bearing TB3 and the second disc portion 21*d* of the central shaft 21), and the reaction force of the second reaction force generating portion (the thrust bearing TB1 and the first disc portion 21*c* of the central shaft 21). Therefore, in the continuously variable transmission mechanism 10, desired contact pressure can be generated between the input disc 17 and the output disc 18, and the respective planetary balls 14 and a transmission torque capacity according to the contact pressure can be secured. As a result, in the continuously variable transmission 1, the torque input to the input shaft 30 is adjusted to the torque according to the transmission torque capacity and is transmitted to the output shaft 40. The transmission torque capacity at this time is set according to the respective thrusts. Therefore, here, the first group 60 of helical gears and the second group 70 of helical gears may be formed to generate greater thrusts than in the above example to compensate for decreases in the thrusts of the input-side cam mechanism 51 and the output-side cam mechanism 52.

In the normal rotation of the output shaft 40 as when the torque in the normal direction is input to the output shaft 40, the output-side cam mechanism 52 cannot generate an axial thrust but can rotate the output disc 18 in the same direction as the output shaft 40. Therefore, in the normal rotation of the output shaft 40, the thrust of the first helical gear 61 of the first group 60 of helical gears is transmitted to the output shaft 40 to push the input disc 17 and the output disc 18 against the respective planetary balls 14. Therefore, by the frictional forces at the contact portions between the outer peripheral faces of the respective planetary balls 14 and the contact face 18*a* of the output disc 18, the torque is transmitted from the output disc 18 to the respective planetary balls 14 and the respective planetary balls 14 rotate on their axes. The respective planetary balls 14 rotating on their axes further generate frictional forces between their outer peripheral faces and the contact face 17*a* of the input disc 17 and therefore transmit the torque to the input disc 17 and rotate the input disc 17 in the same normal direction as the output shaft 40 and the output disc 18.

At this time, the input-side cam mechanism 51 cannot generate the axial thrust but rotates with the input shaft 30 in the same direction as the input disc 17 with respect to the central shaft 21. In this way, the first helical gear 71 of the second group 70 of helical gears generates the thrust in the normal rotation. Therefore, in the same manner as in the above-described normal rotation of the input shaft 30, it is possible to push the input disc 17 and the output disc 18 against the respective planetary balls 14 based on the thrust of the first helical gear 71.

In other words, during the normal rotation of the output shaft 40, it is possible to push the input disc 17 and the output disc 18 against the respective planetary balls 14 with suitable strength by means of the thrust by the first group 60 of helical gears (the first helical gear 61 and the second helical gear 62), the thrust of the second group 70 of helical gears (the first helical gear 71 and the second helical gear 72), the reaction force of the first reaction force generating portion (the thrust bearing TB3 and the second disc portion 21*d* of the central shaft 21), and the reaction force of the second reaction force generating portion (the thrust bearing TB1 and the first disc portion 21*c* of the central shaft 21). Therefore, in the continuously variable transmission mechanism 10, desired contact pressure can be generated between the input disc 17 and the output disc 18, and the respective planetary balls 14 and a transmission torque capacity according to the contact pressure can be secured. As a result, in the continuously variable transmission 1, the torque input to the input shaft 30 is adjusted to the torque according to the transmission torque capacity and is transmitted to the output shaft 40. The transmission torque capacity at this time is set according to the respective thrusts. Therefore, here, the thrusts of the first group 60 of helical gears and the second group 70 of helical gears may be determined to compensate for decreases in the thrusts of the input-side cam mechanism 51 and the output-side cam mechanism 52 as described in the above reverse rotation of the input shaft 30.

As described above, according to the continuously variable transmission 1 in the embodiment, whichever of the input shaft 30 and the output shaft 40 the torque is input to and whether the rotating direction of the torque is the normal or reverse direction, the suitable transmission torque capacity can be secured and the speed change and transmission of the input torque are possible. In other words, even if the continuously variable transmission 1 has such a structure that the input shaft 30 is used as the output shaft and the output shaft 40 is used as the input shaft, it is possible to appropriately transmit the torque between the input side and the output side.

Here, if loads on the input-side cam mechanism 51 and the output-side cam mechanism 52 increase as a result of compensation for the thrusts, it is preferable to generate axial thrusts in the input-side cam mechanism 51 and the output-side cam mechanism 52. Therefore, here, the input-side cam mechanism 51 is replaced with an input-side cam mechanism 151 shown in FIG. 7, for example.

The input-side cam mechanism 151 generates an axial thrust when the input shaft 30 or the input disc 17 rotates in each of the normal and reverse directions. The input-side cam mechanism 151 includes an annular first rotary member 151*a* and an annular second rotary member 151*b* having the rotation axis X as their central axes and disposed to face each other on the rotation axis X and cam rollers 151*c* sandwiched between opposed faces of the first rotary member 151*a* and the second rotary member 151*b*. Here, each of the cam rollers 151*c* is sandwiched between cam faces 151*d* respectively formed on the opposed faces of the first rotary member 151*a* and the second rotary member 151*b*. Each cam face 151*d* is inclined so that an axial interval between a standard face and itself gradually widens in the circumferential direction in the normal rotation and is inclined from the largest interval portion so that the interval gradually narrows in the circumferential direction in the normal rotation. In other words, the cam face 151*d* is in a shape of a valley groove with respect to the standard face.

Here, the first rotary member 151*a* is disposed to rotate integrally with the annular face of the annular portion 32*b* of the input hub 32 and the second rotary member 151*b* is disposed to rotate integrally with a radially outer end portion of the input disc 17. Therefore, if the torque in the normal direction is input to the input shaft 30 or the torque in the reverse direction is input to the input disc 17, the input-side cam mechanism 151 can transmit the torque and generate the axial thrust similarly to the input-side cam mechanism 51. On the other hand, if the torque in the reverse direction is input to the input shaft 30 or the torque in the normal direction is input to the input disc 17, the input-side cam mechanism 151 can transmit the torque and generate the axial thrust though its movement is reverse to that in the normal rotation of the input shaft 30 or the reverse rotation of the input disc 17.

Even if the input-side cam mechanism 151 is used, operation of the continuously variable transmission 1 in the normal rotation of the input shaft 30 and the reverse rotation of the output shaft 40 is the same as that in the above description in which the input-side cam mechanism 51 is used.

On the other hand, in the reverse rotation of the input shaft 30 and the normal rotation of the output shaft 40, the input-side cam mechanism 151 generates an axial thrust. As a result, in the reverse rotation of the input shaft 30 or in the normal rotation of the output shaft 40, it is possible to push the input disc 17 and the output disc 18 against the respective planetary balls 14 with suitable strength by means of the thrust of the input-side cam mechanism 151, the thrust by the first group 60 of helical gears (the first helical gear 61 and the second helical gear 62), the thrust by the second group 70 of helical gears (the first helical gear 71 and the second helical gear 72), the reaction force of the first reaction force generating portion (the thrust bearing TB3 and the second disc portion 21d of the central shaft 21), and the reaction force of the second reaction force generating portion (the thrust bearing TB1 and the first disc portion 21c of the central shaft 21). As a result, the thrust of the input-side cam mechanism 151 is added to the force for pushing the input disc 17 and the output disc 18 against the respective planetary balls 14 at this time and therefore, it is possible to secure the suitable transmission torque capacity even if the thrusts of the first group 60 of helical gears and the second group 70 of helical gears are decreased. Consequently, it is possible to reduce the loads on the first group 60 of helical gears and the second group 70 of helical gears.

Alternatively, the output-side cam mechanism 52 may be replaced with an output-side cam mechanism 152 shown in FIG. 7 and having the similar structure to the input-side cam mechanism 151.

The output-side cam mechanism 152 includes a first rotary member 152a, a second rotary member 152b, cam rollers 152c, and cam faces 152d. Here, the first rotary member 152a is disposed to rotate integrally with a radially outer end portion of the output disc 18 and the second rotary member 152b is disposed to rotate integrally with an annular end face of the second cylindrical portion 40c. Therefore, the output-side cam mechanism 152 can generate an axial thrust when the output shaft 40 or the output disc 18 rotates in each of the normal direction and the reverse direction.

If the output-side cam mechanism 152 is used, in the normal rotation of the input shaft 30 and the reverse rotation of the output shaft 40, the continuously variable transmission 1 operates in the same manner as in the above description where the output-side cam mechanism 52 is used.

On the other hand, in the reverse rotation of the input shaft 30 or in the normal rotation of the output shaft 40, the output-side cam mechanism 152 generates an axial thrust and therefore it is possible to push the input disc 17 and the output disc 18 against the respective planetary balls 14 with suitable strength by means of the thrust of the output-side cam mechanism 152, the thrust by the first group 60 of helical gears (the first helical gear 61 and the second helical gear 62), the thrust by the second group 70 of helical gears (the first helical gear 71 and the second helical gear 72), the reaction force of the first reaction force generating portion (the thrust bearing TB3 and the second disc portion 21d of the central shaft 21), and the reaction force of the second reaction force generating portion (the thrust bearing TB1 and the first disc portion 21c of the central shaft 21). As a result, at this time, the thrust of the output-side cam mechanism 152 is added to the force for pushing the input disc 17 and the output disc 18 against the respective planetary balls 14 and therefore, it is possible to secure the suitable transmission torque capacity even if the thrusts of the first group 60 of helical gears and the second group 70 of helical gears for compensating for the thrust of the output-side cam mechanism 152 are decreased. Consequently, it is possible to reduce loads on the first group 60 of helical gears and the second group 70 of helical gears.

Furthermore, both of the input-side cam mechanism 51 and the output-side cam mechanism 52 may be replaced with input-side cam mechanism 151 and the output-side cam mechanism 152. In this case, it is possible to reduce the loads on the first group 60 of helical gears and the second group 70 of helical gears to about the same degrees as in the above-described example in which the input-side cam mechanism 51 and the output-side cam mechanism 52 are used.

Here, in the embodiment, the first group 60 of helical gears and the second group 70 of helical gears are shown as examples of the axial force generating portions. However, the axial force generating portions are not necessarily limited to the pairs of helical gears. For example, as the axial force generating portions, electric actuators such as electric motors or hydraulic actuators that can operate equivalently to the first group 60 of helical gears and the second group 70 of helical gears may be used.

The first axial force generating portion may be formed to generate the axial thrust for pushing the input disc 17 toward the output disc 18 and not to generate an opposite force. In this case, the continuously variable transmission 1 preferably has an opposite force generating portion or structure for generating an axial opposite force which is a force in such a direction as to move the input disc 17 away from the output disc 18 and which is opposite to the thrust of the first axial force generating portion. Similarly, the second axial force generating portion may be formed to generate the axial thrust for pushing the output disc 18 toward the input disc 17 and not to generate an opposite force. In this case, the continuously variable transmission 1 preferably has an opposite force generating portion or structure for generating an axial opposite force which is a force in such a direction as to move the output disc 18 away from the input disc 17 and which is opposite to the thrust of the second axial force generating portion.

INDUSTRIAL APPLICABILITY

As described above, the continuously variable transmission according to the invention includes the input member, the output member, and the rotary members sandwiched therebetween, transmits the torque between the input member and the output member by means of the frictional forces generated by pushing the input member and the output member against the rotary members, continuously varies the transmission gear ratio between the input member and the output member, and is useful as a technique capable of suitably generating the pressing forces in axial opposite directions between the input member and the output member.

The invention claimed is:

1. A continuously variable transmission comprising a continuously variable transmission mechanism including an input member, an output member, and a rotary member sandwiched therebetween, transmitting torque between the input member and the output member by means of frictional forces generated by pushing the input member and the output member against the rotary member, and continuously varying a transmission gear ratio between the input member and the output member, wherein the continuously variable transmission includes
a first axial force generating portion capable of generating a first axial force for pushing the input member toward the output member,
a second axial force generating portion capable of generating a second axial force for pushing the output member toward the input member, and an opposite axial force transmitting portion for transmitting, when an opposite axial force in such a direction as to move the input member away from the output member and opposite force to the first force is generated on a side of the input member, the opposite force to the output member to push the output member toward the input member.

2. The continuously variable transmission according to claim 1, wherein the first axial force generating portion can generate the opposite force as well as the first force.

3. The continuously variable transmission according to claim 1, wherein the first axial force generating portion rotates in one direction to generate the first force and rotates in the other direction to generate the opposite force.

4. The continuously variable transmission according to claim 1, wherein the second axial force generating portion can generate the opposite force as well as the second force.

5. The continuously variable transmission according to claim 1, wherein the second axial force generating portion rotates in one direction to generate the second force and rotates in the other direction to generate the opposite force.

6. A continuously variable transmission comprising a continuously variable transmission mechanism including an input member, an output member, and a rotary member sandwiched therebetween, transmitting torque between the input member and the output member by means of frictional forces generated by pushing the input member and the output member against the rotary member, and continuously varying a transmission gear ratio between the input member and the output member, wherein the continuously variable transmission includes a first axial force generating portion for rotating in one direction to generate a first axial force for pushing the input member toward the output member and for rotating in the other direction to generate an axial opposite force opposite to the first force, a second axial force generating portion capable of generating a second axial force for pushing the output member toward the input member, and an opposite axial force transmitting portion for transmitting the opposite force to the output member to push the output member toward the input member when the first axial force generating portion generates the opposite force.

* * * * *